United States Patent

Chen et al.

(10) Patent No.: US 9,025,245 B2
(45) Date of Patent: May 5, 2015

(54) CHROMATIC CONFOCAL MICROSCOPE SYSTEM AND SIGNAL PROCESS METHOD OF THE SAME

(71) Applicant: National Taipei University of Technology, Taipei (TW)

(72) Inventors: Liang-Chia Chen, Taipei County (TW); Yi-Wei Chang, Yilan County (TW)

(73) Assignee: National Taipei University of Technology, Taipei (TW)

( * ) Notice: Subject to any disclaimer, the term of this patent is extended or adjusted under 35 U.S.C. 154(b) by 192 days.

(21) Appl. No.: 13/684,827

(22) Filed: Nov. 26, 2012

(65) Prior Publication Data

US 2013/0135715 A1 May 30, 2013

(30) Foreign Application Priority Data

Nov. 29, 2011 (TW) .............................. 100143779 A

(51) Int. Cl.
*G02B 21/06* (2006.01)
*G02B 21/00* (2006.01)

(52) U.S. Cl.
CPC ............ *G02B 21/06* (2013.01); *G02B 21/0032* (2013.01); *G02B 21/0064* (2013.01)

(58) Field of Classification Search
CPC . G02B 21/06; G02B 21/0032; G02B 21/0064
USPC ............................ 359/385, 389; 356/485, 489
See application file for complete search history.

(56) References Cited

U.S. PATENT DOCUMENTS

| 6,038,066 | A  | * | 3/2000 | Baumann .................... 359/368 |
| 6,407,373 | B1 | * | 6/2002 | Dotan ....................... 250/201.3 |
| 7,477,401 | B2 | * | 1/2009 | Marx et al. ................ 356/609 |
| 8,773,545 | B2 | * | 7/2014 | Koishi ....................... 348/222.1 |
| 2003/0112504 | A1 | * | 6/2003 | Czarnetzki et al. .......... 359/383 |
| 2004/0051879 | A1 |   | 3/2004 | Schick |
| 2013/0100272 | A1 | * | 4/2013 | Price et al. .................... 348/79 |

FOREIGN PATENT DOCUMENTS

DE         102008006826 A1 *  8/2009  ............. G02B 21/02

* cited by examiner

*Primary Examiner* — Frank Font
(74) *Attorney, Agent, or Firm* — WPAT, PC; Justin King

(57) ABSTRACT

A chromatic confocal microscope system and signal process method is provided to utilize a first optical fiber module for modulating a light into a detecting light passing through a chromatic dispersion objective and thereby forming a plurality of chromatic dispersion lights to project onto an object. A second optical fiber module conjugated with the first optical fiber module receives a reflected object light for forming a filtered light, which is split into two filtered lights detected by two color sensing units for generating two sets of RGB intensity signals, wherein one set of RGB intensity signals is adjusted relative to the other set of RGB intensity signals. Then two sets of RGB intensity signals are calculated for obtaining a maximum ratio factor. Finally, according to the maximum ratio factor and a depth relation curve, the surface profile of the object can be reconstructed.

24 Claims, 18 Drawing Sheets

CHROMATIC CONFOCAL MICROSCOPE SYSTEM AND SIGNAL PROCESS METHOD OF THE SAME

CROSS-REFERENCE TO RELATED APPLICATION

The present application claims priority from Taiwan Patent Application No. 100143779 filed in the Taiwan Patent Office on Nov. 29, 2011, the entire content of which is incorporated herein by reference.

TECHNICAL FIELD

The present invention is related to a technique of surface profilometry, and more particularly, to a chromatic confocal microscope system and signal process method of the same for surface profile measurement.

BACKGROUND

Conventional confocal chromatic microscope system is installed on desktop so as to perform a vertical or lateral scan on an object for obtaining a surface profile of the object. Due to large system volume inducing disadvantages of occupying too much space, there has a limitation for utilizing the conventional confocal chromatic microscope system to perform surface profile measurement on the object, such as 8-inch wafer having a plurality of large scale integration (LSI) chips formed thereon, thereby reducing practicability and convenience of the entire configuration.

In the conventional arts, such as US. Pub. No. 2004/0051879, it disclosed a confocal displacement sensor wherein, through an advanced arrangement of optical outputs relative to an imaging optic in the object area of displacement sensor, real images of the optical outputs can be created at different heights. In this art, two measurement beams are created by two planar light sources, and two planar high-resolution cameras are arranged for light intensity detection. The height position of the scanned points of the surface can be calculated and the surface to be measured can be measured simultaneously at a number of scanning points. In addition, it is also known that a color sensing unit is utilized to detect the intensity ratio of the object surface, whereby a surface height or depth can be obtained by calculation according to relationship between color intensity and depth.

However, since the reflection rate with respect to RGB color is varied with the property of object surface, such as color of the object surface, it is necessary to establish a depth relation curve corresponding to the reflection rate of different colors for the surface profile measurement, which is inconvenient for the inspection operator. In addition, another drawback is that the slit structure is indispensable for receiving the object light from the object in the convention configuration, so that a cross talk caused by an overlap between neighboring object light, unfocused light, and stray light will be generated inevitably, thereby decreasing effect of image detection resolution.

Accordingly, there is a need for providing a chromatic confocal microscope system and signal process method to overcome the disadvantages generated by the conventional arts.

SUMMARY

The present invention provides a chromatic confocal microscope system having a pair of color sensing units arranged at different focusing positions respectively relative to focal points of two filtered object lights corresponding to a same inspection point, whereby the pair of color sensing units can generate different intensity response with respect to the same inspection point for obtaining a first set of RGB intensity signals and a second set of RGB intensity signals, which can be utilized to overcome the variation of reflection rate with respect to different surface colors of the object.

The present invention provides a chromatic confocal microscope system having a first optical fiber module for modulating a detecting light into a linear or a planar detecting light projected onto the object, and a second optical fiber module conjugating to the first optical fiber module for performing a spatial-filtering process on a linear or planar object light reflected from the object, wherein the second optical fiber module comprises a plurality of optical fibers for filtering out the stray lights and unfocused lights within the linear or planar object light, and allowing the focused linear or planar object lights to pass therethrough thereby preventing the object lights, stray lights, and unfocused lights from being overlapped to generate cross talk so as to obtain accurate surface profile of the object with height resolution.

The present invention further provides a signal process method for chromatic confocal microscope system which comprises steps of building a depth relation curve of the system, and obtaining the surface profile of the object according to intensity response, which is obtained by shifting positions for arranging a pair of color sensing unit to detect a linear or planar object light reflected from the object.

The present invention further provides a signal process method for chromatic confocal microscope system which acquires color information of the object surface through a filter and color sensing units under one-time projection, and obtains depth of each inspection position on the object surface corresponding to each sensing element (pixel) of each color sensing unit according to depth relation curve. Accordingly, the present invention is capable of performing a large-area scanning inspection for reducing measurement time and minimizing the influences caused by the vibration during the inspection process.

In one embodiment, the present disclosure provides a chromatic confocal microscope system, comprising: a light source module, providing a linear or a planar detecting light; a chromatic dispersion objective, axially dispersing the linear or the planar detecting light thereby forming a plurality of sub lights respectively having a focal length different from each other, and projecting the plurality of sub lights on an object for forming a linear or a planar object light; an optical module, splitting the linear or the planar object light into a first object light having a first focal point and a second object light having a second focal point; a pair of color sensing units, respectively receiving the first object light at a first position and the second object light at a second position for respectively generating a plurality of sets of first RGB intensity signals and a plurality of sets of second RGB intensity signals having an offset from the plurality sets of first RGB intensity signals, wherein each set of first and second RGB intensity signals are corresponding to each inspection position on a surface receiving the linear or the planar detecting light of the object, and each set of first RGB intensity signals has a first red light intensity signal, a first green light intensity signal, and a first blue light intensity signal, and each set of second RGB intensity signals has a second red light intensity signal, a second green light intensity signal, and a second blue light intensity signal; and a signal processing unit, performing a calculation on the plurality sets of first and second RGB intensity signals for obtaining a normalization focal ratio index of red light, a normalization focal ratio index of green light, and a normalization focal ratio index of blue light.

In another embodiment, the present disclosure further provides a method for processing signal generated from a chromatic confocal microscope system, comprising steps of: providing a chromatic confocal microscope system having a chromatic dispersion objective and a pair of color sensing units; establishing a depth relation curve with respect to the chromatic confocal microscope system; forming a plurality of sub lights respectively having a focal length different from each other by utilizing the chromatic dispersion objective to axially disperse a linear or a planar detecting light; projecting the plurality of sub lights onto an object and the plurality of sub lights being reflected therefrom for forming a linear or a planar object light; splitting the linear or the planar object light into a first object light and a second object light respectively being focused on a focal point; utilizing the pair of color sensing units for respectively receiving the first object light at a first position and the second object light at a second position for respectively generating a plurality of sets of first RGB intensity signals and a plurality of sets of second RGB intensity signals having an offset away from the plurality sets of first RGB intensity signals, wherein each set of first and second RGB intensity signals are corresponding to each inspection position on a surface receiving the linear or the planar detecting light of the object, and each set of first RGB intensity signals has a first red light intensity signal, a first green light intensity signal, and a first blue light intensity signal, and each set of second RGB intensity signals has a second red light intensity signal, a second green light intensity signal, and a second blue light intensity signal; performing a calculation on the plurality sets of first and second RGB intensity signals for obtaining a normalization focal ratio index of red light, a normalization focal ratio index of green light, and a normalization focal ratio index of blue light; determining a maximum ratio factor from the normalization focal ratio index of red light, the normalization focal ratio index of green light, and the normalization focal ratio index of blue light; and a surface profile of the object according to the maximum ratio factor of each inspection position and a corresponding depth relation curve.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1A:
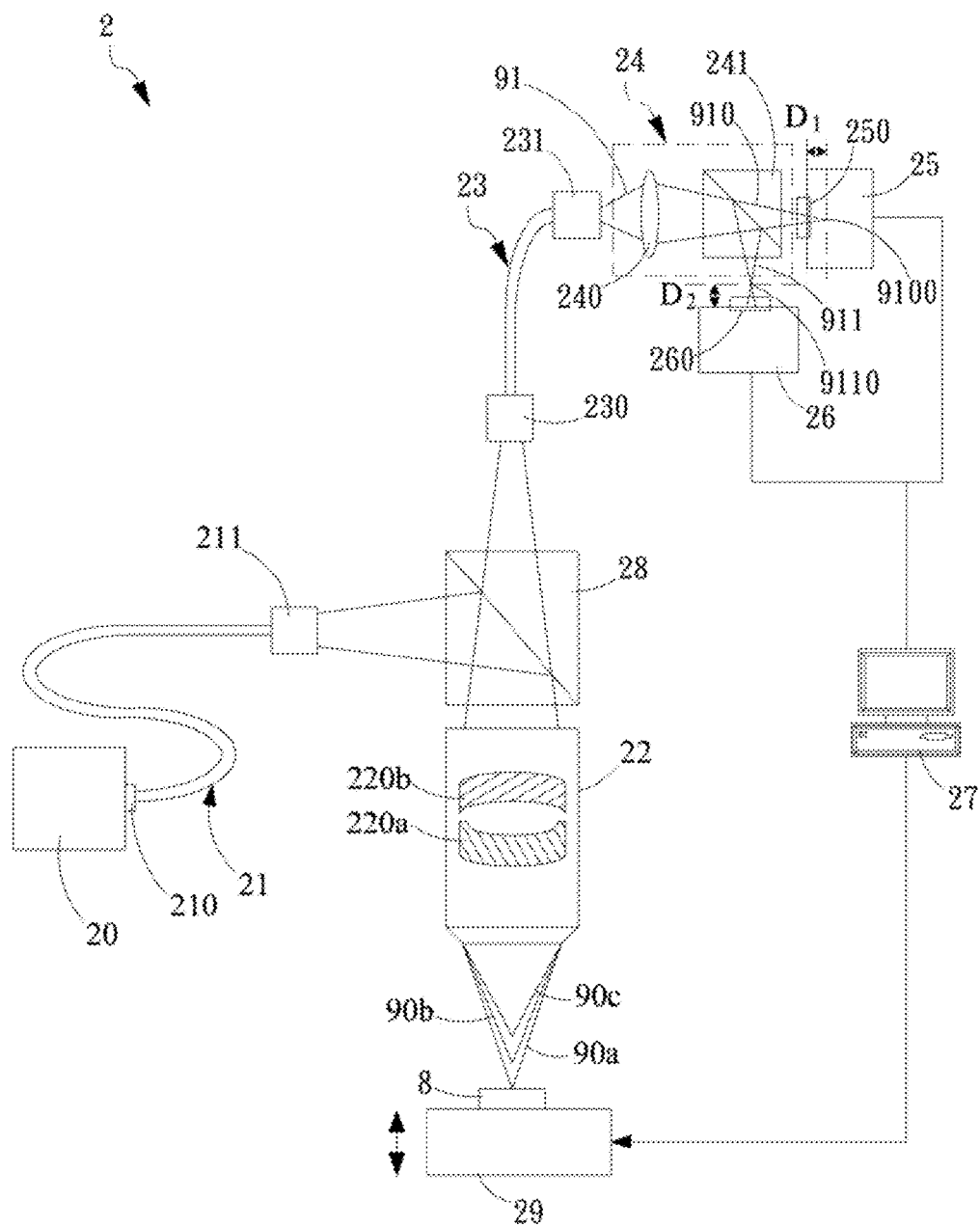
FIG. 1A illustrates a chromatic confocal microscope system according to an embodiment of the present invention.

Please refer to FIG. 1A, which illustrates a chromatic confocal microscope system according to an embodiment of the present invention. The chromatic confocal microscope system 2 comprises a light source module 20, a chromatic dispersion objective 22, a second optical fiber module 23, an optical module 24, a pair of color sensing units 25 and 26, and a signal processing unit 27. The light source module 20 being capable of providing a planar detecting light comprises a light source 200 and a first optical fiber module 21. The light source 200 provides a beam field, which is a detecting light field having a continuous optical spectrum. The first optical module 21 comprises an optical fiber bundle having a plurality of optical fibers and optical fiber connectors 210 and 211 respectively coupled to the two ends of the optical fiber bundle. The first optical fiber connector 210 is coupled to the light source 200 for receiving the light field and transmitted the light filed to the optical fiber bundle. The optical fiber connector 211 is coupled to a beam splitter 28 for modulating the light field received from the optical fiber bundle into the planar detecting light. It is noted that although the detecting light in the present embodiment is a planar detecting light, alternatively, the detecting light can be a linear light field as well. In the present embodiment, the detecting light is the planar detecting light for the following explanation.

Figure 2A:
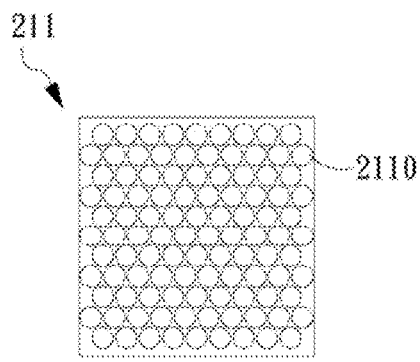
FIG. 2A illustrates a cross-sectional schematic view of the first optical fiber module according to an embodiment of the present invention.
Figure 2B:
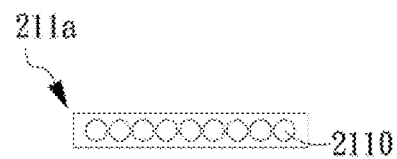
FIG. 2B illustrates another cross-sectional schematic view of the first optical fiber module according to another embodiment of the present invention.
Figure 2C:
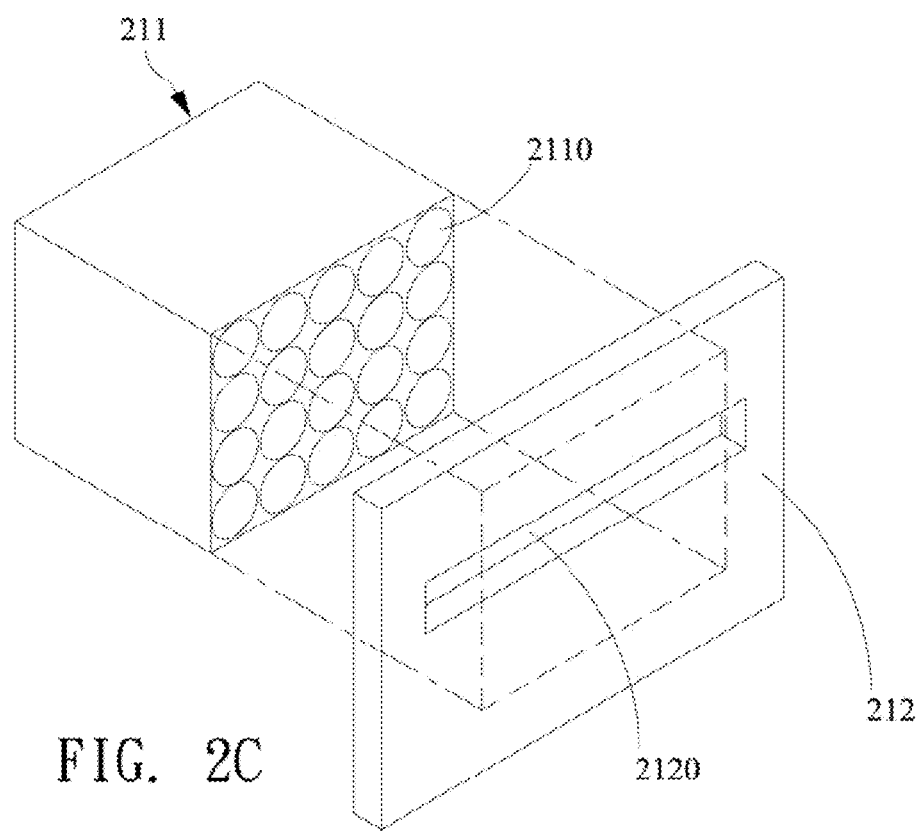
FIG. 2C illustrates another embodiment of the optical fiber connector according to the present invention.

Please refer to FIG. 2A, which illustrates a cross-sectional schematic view of the first optical fiber module according to an embodiment of the present invention. In the present embodiment, the plurality of optical fibers 2110 are two-dimensionally arranged within the optical fiber connector 211. In addition to the two dimensional arrangement, please refer to FIG. 2B, which illustrates another cross-sectional schematic diagram of the first optical fiber module according to another embodiment of the present invention. In the embodiment shown in FIG. 2B, the plurality of optical fibers 2110 are arranged one-dimensionally within the optical fiber connector 211a. It is noted that the light source module 20 is not limited to the combination of light source 200 and the first optical fiber module 21 shown in FIG. 1A; alternatively, for example, the light source 20 is formed by a plurality of light emitting diodes arranged two-dimensionally for forming a planar light source or arranged one-dimensionally for forming a linear light source. In addition to the foregoing embodiments for generating the linear detecting light, FIG. 2C illustrates another embodiment of the optical fiber connector according to the present invention. In the embodiment shown in FIG. 2C, it generates a linear detecting by a combination of two-dimensional fiber array and a plate 212 have a slot-type opening 2120. The plate 212 is arranged at a side of the two-dimensional fiber array within the optical fiber connector 211 in a manner that the slot-type opening 2120 is corresponding to one row of the optical fibers array, thereby generating the linear detecting light.

Please refer to FIG. 1A, the planar detecting light generated by the first optical fiber module 21 is transmitted to the beam splitter 28, and subsequently is transmitted to the chromatic dispersion objective 22. In the present embodiment, the chromatic dispersion objective 22 comprises at least two chromatic aberration lenses 220a and 220b for axially dispersing the planar detecting light so as to form a plurality of sub lights mainly represented by the numeric notation 90a, 90b, and 90c. The plurality of sub planar lights 90a~90c respectively has a focal length different from each other. Each sub planar light 90a, 90b, or 90c has a specific wavelength so that the plurality of sub planar lights 90a~90c forms a continuous optical spectrum, which can be a visible optical spectrum or an invisible optical spectrum.

The plurality of sub planar lights 90a, 90b, and 90c are focused onto a surface of an object 8 under test. In the present embodiment, the object 8 is disposed onto a moving platform 29, which can perform at least a Z-axis movement for adjusting the distance between the object 8 and the chromatic dispersion objective 22. In addition to Z-axis movement, the moving platform 29, alternatively, is capable of performing a planar movement on X-Y plane perpendicular to the Z axis though a driving unit such as a combination of screw, guide rail, and motor, which are well-known by the one having ordinary skills in the art. It is noted that although the chromatic dispersion objective 22 in the present embodiment is utilized to disperse the planar detecting light into the plurality of sub planar lights 90a-90c, alternatively, the chromatic dispersion objective 22 is capable of being utilized to disperse a linear detecting light into a plurality of sub linear lights.

Figure 3A:
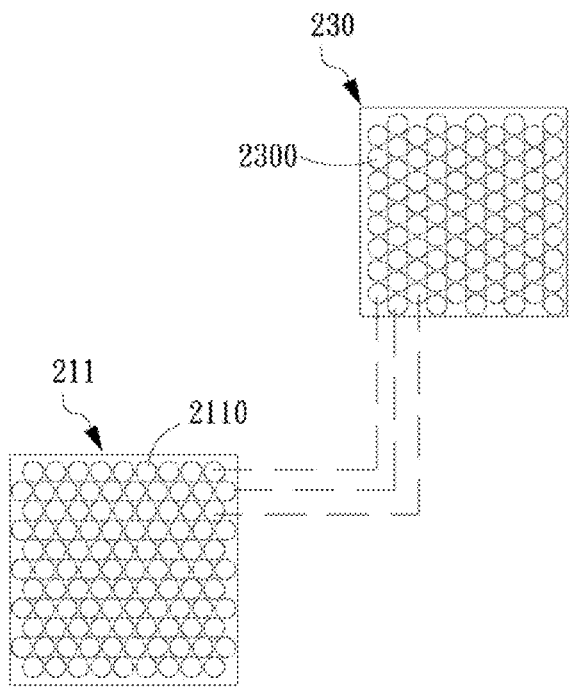
FIG. 3A illustrates a conjugation relation between the first and second optical fiber module according to an embodiment of the present invention.

The plurality of sub planar lights 90a~90c projected onto the object 8 are reflected to form a planar object light. The planar object light passes through the chromatic dispersion object 22 and the beam splitter 28, and is received by the second optical fiber module 23. Likewise, the second optical fiber module 23 has a optical fiber bundle having a plurality of optical fibers, and optical fiber connectors 230 and 231 respectively coupled to the two ends of the optical fiber bundle, wherein the optical fiber connector 230 is further coupled to the beam splitter 28 while the optical fiber connector 231 is further coupled to the optical module 24. Similarly, like the optical fiber connector 211 shown in FIG. 2A, the cross section of the optical fiber connectors 230 and 230 are respectively formed by the plurality of fibers arranged two-dimensionally, thereby forming an optical fiber array. Please refer to FIG. 3A, which illustrates a conjugation relation between the first and second optical fiber module according to the present invention. In FIG. 3A, the plurality of optical fibers 2110 arranged two-dimensionally within the optical fibers connector 211 has a point-to-point conjugation relationship with the plurality of optical fibers 2300 arranged two-dimensionally within the optical fiber connector 230.

Figure 3B:
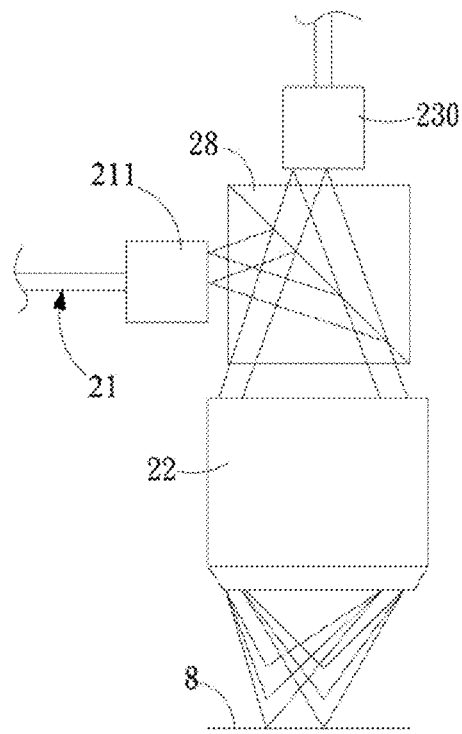
FIG. 3B illustrates an optical path between the first optical fiber module and second optical fiber module.
Figure 3C:
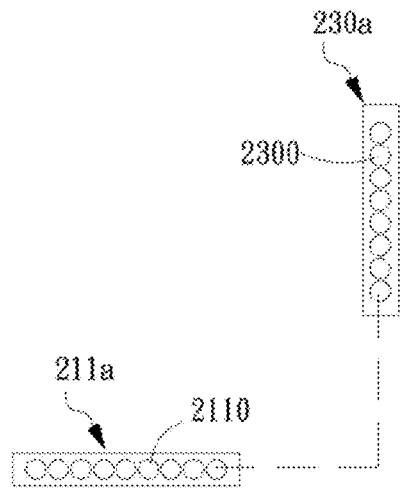
FIG. 3C illustrates an alternative embodiment for generating linear detecting light and linear object light.

Please refer to the FIG. 3B, which illustrates an optical path between the first optical fiber module and second optical fiber module. In the FIG. 3B, a detecting light emitted from one of the fibers within the optical fiber connector 211 is reflected from the object 8 and passes through the chromatic dispersion objective 22 and the beam splitter 28, and finally is received by one of the fiber arranged within the optical fiber connector 230 being conjugating with the fiber arranged within the optical fiber connector 211. It is noted that when the reflected planar object light passes through the beam splitter 28 and projects onto the optical fiber connector 230, the optical fiber array within the optical fiber connector 230 acts as a spatial filter to filter the planar object light, thereby forming a filtered light which is a multi-wavelength focus-to-depth light having information with respect to the surface height of the object. Since each optical fiber within the optical fiber connector 230 only allows the focused light passing therethrough, the unfocused light and stray light can be filtered out, thereby eliminating influence of cross talk generated due to optical overlap, usually occurred when using slit as a filter, and improving the resolution of optical signals for enhancing the image quality. In addition to the conjugating relation between two-dimensional optical fiber arrays, a linearly conjugating relation between the optical fiber connectors 211a and 230a is also illustrated in FIG. 3C, which can be an alternative embodiment of spatial filter for linear detecting light and linear object light.

Please return back to FIG. 1A, the optical module 24 is utilized to split the filtered light 91 into a first filtered light 910 and a second filtered light 911. In the present embodiment, the optical module 24 comprises a focus lens 240, and a beam splitter 241, wherein the focus lens 240 is utilized to focus the filtered light 91, while the beam splitter 241 is utilized to receive the filtered light 91 and subsequently divide the filtered light 91 into the first filtered light 910 and the second filtered light 911 respectively having a focal point 9100, and 9110.

The pair of color sensing units 25 and 26 respectively sense the first filtered light 910 at a first position and the second filtered light 911 at a second position for respectively generating a plurality of sets of first RGB intensity signals and a plurality of sets of second RGB intensity signals having an offset from the plurality sets of first RGB intensity signals, wherein each set of first and second RGB intensity signals are corresponding to a same inspection position on a surface receiving the planar detecting light of the object, and each set of first RGB intensity signals has a first red light intensity signal, a first green light intensity signal, and a first blue light intensity signal, and each set of second RGB intensity signals has a second red light intensity signal, a second green light intensity signal, and a second blue light intensity signal.

In the present embodiment, a way for generating the offset between the first and second set of RGB intensity signals is to adjust the first position of the color sensing unit 25 relative to the focal point of the first filtered light or adjust the second position of the color sensing unit 26 relative to the focal point of the second filtered light. For example, in one embodiment, a distance relation between the first position and the focal point of the first filtered light 910 is different from a distance relation between the second position and the focal point of the second filtered light 911 such that the offset between first set of RGB intensity signals can be created. Please refer to FIG. 1A, taking position of a sensing chip 250 as the first position of the color sensing unit 25, the sensing chip 250 is arranged at the first position having a distance D1 ahead away from the focal point 9100 of the first filtered light 910. Similarly, taking a sensing chip 260 as the second position of the color sensing unit 26, the sensing chip 260 is arranged at the second position having a distance D2 behind away from the focal point 9110 of the second filtered light 911.

The color sensing unit 25 acquires the first red light intensity signal, the first green light intensity signal, and the first blue light intensity signal of the first filtered light 910, and the color sensing unit 26 acquires the second red light intensity signal, the second green light intensity signal, and the second blue light intensity signal of the second filtered light 911. It is noted that although the sensing chip 250 is ahead away from the focal point 9100 of the first filtered light 910, and the sensing chip 260 is behind away from the focal point 9110 of the second filtered light 911 in the embodiment shown in FIG. 1A, alternatively, it can also be implemented by arranging the sensing chip 250 behind away from the focal point 9100, and arranging the sensing chip 260 ahead away from the focal point 9110.

Figure 4A:
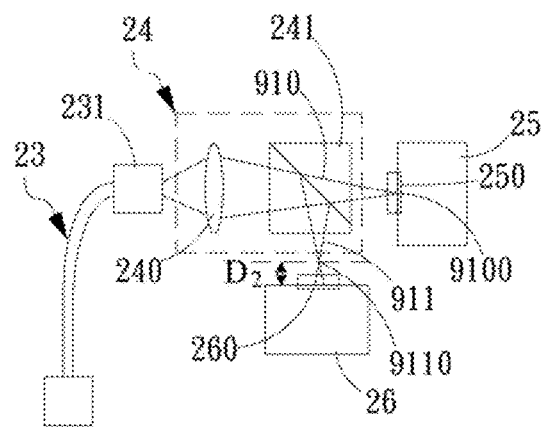
FIGS. 4A and 4B illustrate different embodiments for arranging the color sensing units at different position relative to the focal point of the object light projected thereon.
Figure 4B:
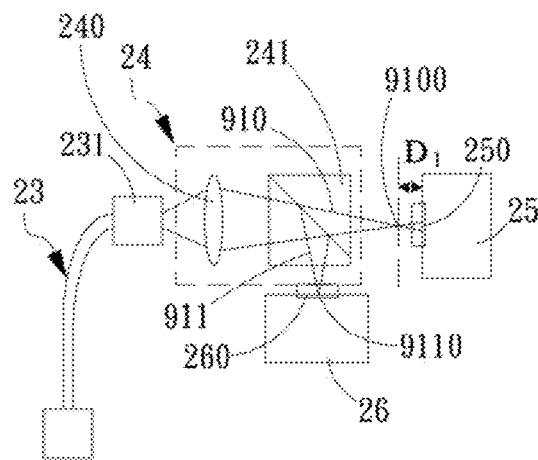

In addition, please refer to FIGS. 4A and 4B, which illustrate the position arrangement of the color sensing units according to different embodiments of the present invention. In FIG. 4A, the sensing chip 250 of the color sensing unit 25 is arranged at the first position right on the focal point 9100 of the first filtered light 910 while the sensing chip 260 of the color sensing unit 26 is arranged at the second position having a specific distance behind away from the focal point 9110 of the second filtered light 911. It is noted that, in the configuration shown in FIG. 4A, the sensing chip 260 of the color sensing unit 26 can also be arranged at the second position having a specific distance ahead away from the focal point 9110 of the second filtered light 911. Alternatively, please refer to FIG. 4B, the sensing chip 250 of the color sensing unit 25 is arranged at the first position having a specific distance behind away from the focal point 9100 of the first filtered light 910 while the sensing chip 260 of the color sensing unit 26 is arranged at the second position right on the focal point 9110 of the second filtered light 911. It is noted that, in the configuration shown in FIG. 4B, the sensing chip 250 of the color sensing unit 25 can also be arranged at the second position having a specific distance ahead away from the focal point 9100 of the first filtered light 910. Each color sensing unit 25 or 26 can be a CCD/CMOS having single RGB chip or a CCD/CMOS being composed of red color sensing chip, green color sensing chip and blue color sensing chip. In addition, the color sensing units 25 and 26 can be linear-type color sensing units or planar-type color sensing units.

It is noted that due to the focusing difference arrangement between the sensing chip 250 of color sensing unit 25 and sensing chip 260 of the color sensing unit 26, a different intensity response with respect to the first and second filtered light 910 and 911 corresponding to the same inspection position can be created by the pair of color sensing units 25 and 26 such that the reflection rate variation caused due to different surface color of the object can be overcome, whereby there has no need to establish depth relation curves with respect to different surface color of the object in the chromatic confocal microscope system of the present invention as well as the flexibility of the present invention for objects having various surface color can be increased.

Please refer back to FIG. 1A, the signal processing unit 27 of the chromatic confocal microscope system 2 receives the optical intensity signals from the color sensing units 25 and 26 and subsequently performs a first calculation process on the plurality sets of first RGB intensity signals, and the plurality sets of second RGB intensity signals for reducing cross talk of the plurality sets of first and second RGB intensity signals, and performs a second calculation on the result generated from the first calculation for obtaining a normalization focal ratio index of red light, a normalization focal ratio index of green light, and a normalization focal ratio index of blue light. The signal processing unit 27 selects a maximum ratio factor from the normalization focal ratio index of red light, the normalization focal ratio index of green light, and the normalization focal ratio index of blue light, and determines a surface height of the object according to the maximum ratio factor and a corresponding depth relation curve with respect to the chromatic confocal microscope system 2. In the embodiment of the present invention, the first calculation is a deconvolution calculation, while the second calculation is a normalization calculation.

Figure 1B:
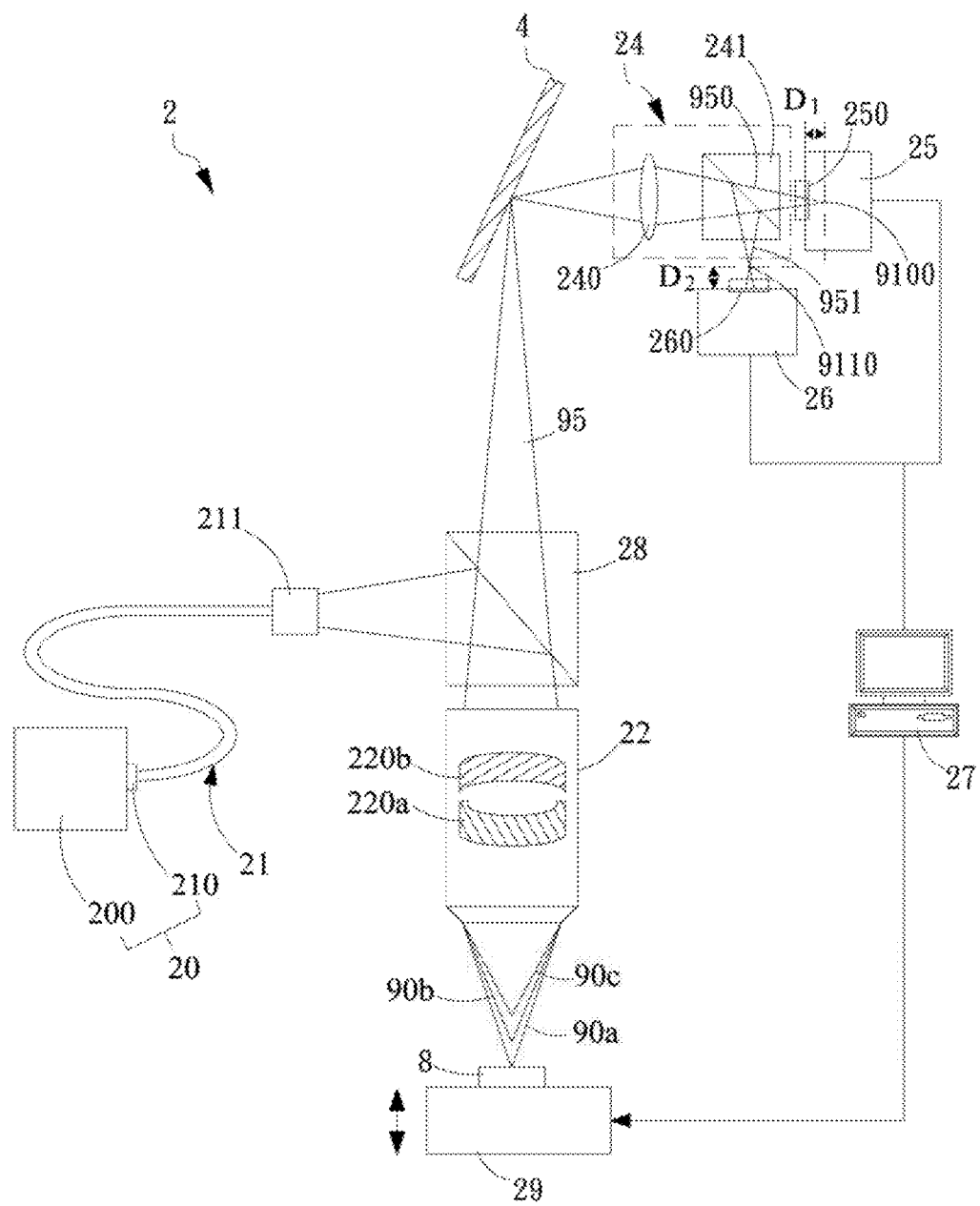
FIG. 1B illustrates another chromatic confocal microscope system according to another embodiment of the present invention.

In addition to the chromatic confocal microscope system shown in FIG. 1A, alternative embodiment is illustrated in FIG. 1B. In the embodiment shown in FIG. 1B, the feature different from the embodiment shown in FIG. 1A is that the planar object light is projected directly on the optical module 24 without the second optical fiber module 23 shown in FIG. 1A. In the embodiment shown in FIG. 1B, a reflecting element 4 is utilized to reflect the planar object light from the chromatic dispersion objective 22 onto the optical module 24. After that, the operation of the optical module 24 is the same as the foregoing embodiment shown in FIG. 1A, which divides the planar object light 95 received from the reflecting element 4 into a first planar object light 950 and a second planar object light 951. It is noted that although the reflecting element 4 is utilized to reflect the planar object light 95 into the optical module 24, the reflecting element 4 is not a necessary element of the present invention, and it can be chosen to use or not according to the need.

In one embodiment, the reflecting element 4 can be a mirror. In an alternative embodiment, the reflecting element 4 can be a micro-reflector array such as a digital micro-mirror device (DMD) or a liquid crystal on silicon (LCoS) device. Taking DMD as an example for explanation the operation, since the DMD has a plurality of micro mirrors arranged two-dimensionally, the mirrors located at specific positions can be selectively controlled through computer to reflect the object light according to the need.

Figure 1C:
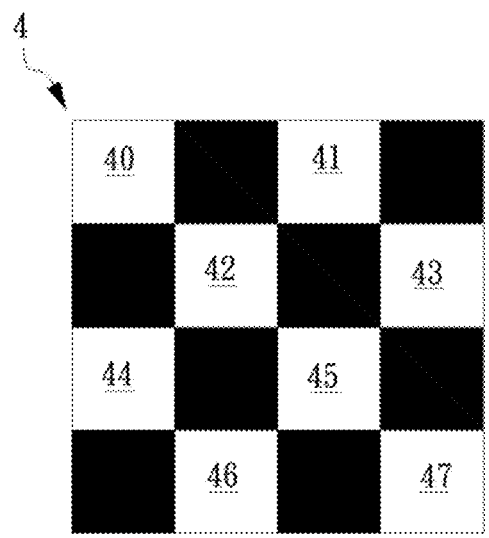
FIGS. 1C and 1D illustrate a reflection control of DMD according to an embodiment of the present invention.
Figure 1D:
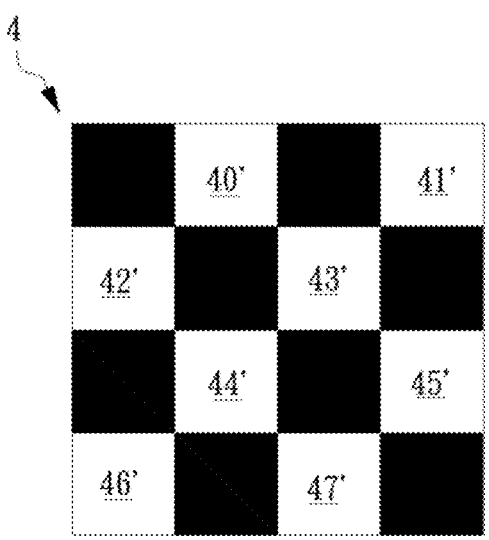

Please refer to FIGS. 1C and 1D, which illustrates a reflection control of DMD according to embodiment of the present invention. In the DMD 4 shown in FIGS. 1C and 1D has a plurality of micro mirrors 40~47, and 40'~47'. Each micro mirror can be selectively switched to be ON status for reflecting light or switched to be OFF status without reflecting light by the computer. Accordingly, through the timing control and ON/OFF control operated by computer, the micro mirrors located at the specific positions can be switched to be on for receiving and reflecting planar object light from the chromatic dispersion objective to a sensing element on the sensing chip of the color sensing unit. For example, in FIG. 1C, at a first time point, micro mirrors 40~47 are controlled to reflect the planar object light corresponding to the positions of the micro mirror 40~47. Thereafter, at a second time point, the micro mirrors 40'~47' shown in FIG. 1D are controlled to reflect the planar object light. By means of the reflection control shown in FIGS. 1C and 1D operated alternately, the cross talk can also be minimized without using the conjugating optical fiber modules shown in FIG. 1A, thereby enhancing the effect of following deconvolution calculation for eliminating the influence of cross talk.

Figure 5:
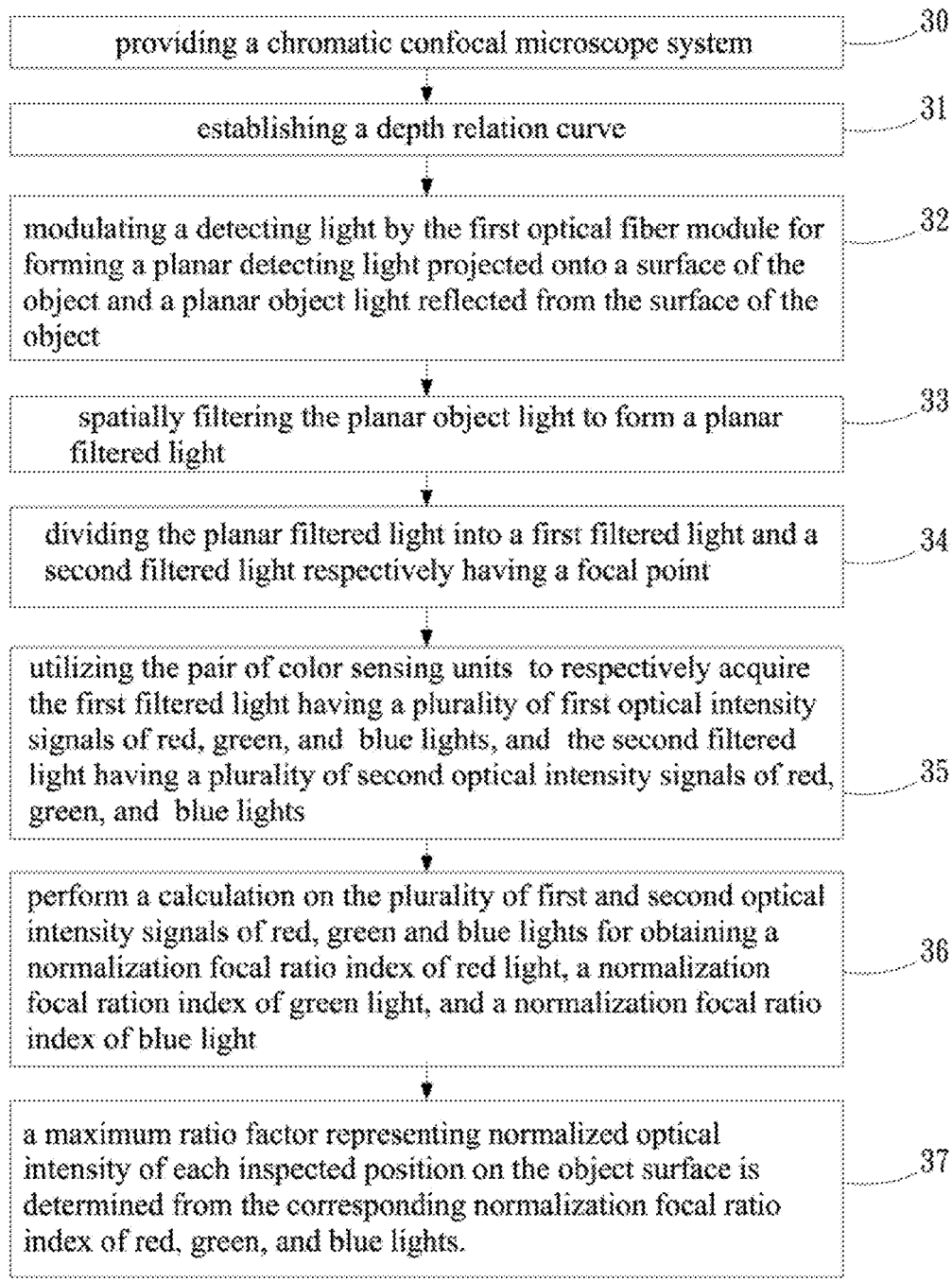
FIG. 5 illustrates a method for processing signals of chromatic confocal microscope system according to an embodiment of the present invention.

Please refer to FIG. 5, which illustrates a method for processing signals of chromatic confocal microscope system according to an embodiment of the present invention. The method is started by step 30 where a chromatic confocal microscope system is provided. It is noted that the chromatic confocal microscope system can be selected as a system shown in FIG. 1A or 1B, wherein the system shown in FIG. 1A is taken as an exemplary embodiment in the following explanation. After that, step 31 is performed where a depth relation curve of the chromatic confocal microscope system 2 is established by the signal processing unit 27. The depth relation curve depicts a relationship between the optical signal intensity and surface depth. Please refer to FIG. 6A, which illustrates an embodiment for establishing the depth relation curve of the present invention. The flow is started by step 310, wherein a calibration plane is arranged on a moving platform 29 and then a vertical scan on a calibration plane is performed by projecting the planar detecting light onto the calibration plane thereby forming a plurality of planar calibration object lights respectively having a focal length different from each other.

Next, step 311 is proceeded wherein the second optical module 23 is utilized to perform the spatial filtering on the planar calibration object light so as to obtain a calibration filtered light which is a multi-wavelength focus-to-depth light containing information of the surface profile of the calibration plane. In the step 311, since the planar object light reflected from the calibration plane passes through the optical fiber connector 230 coupled to the beam splitter 28, the optical fibers array within the optical fiber connector 230 spatially filter the planar object light such that only the focused light can pass through the fibers of the second optical fiber module 23, and other lights such as unfocused lights and stray lights will be filtered out by the optical fiber array of the second optical fiber module 23.

In the next step 312, the calibration filtered light is guided by the second optical fiber module 23 and is transmitted to the optical module 24, wherein the focus lens 240 of the optical module 24 will focus the calibration filtered light onto the beam splitter 241. The beam splitter 241 divides the calibration filtered light into a first calibration filtered light and a second calibration filtered light respectively have a focal point.

Figure 7:
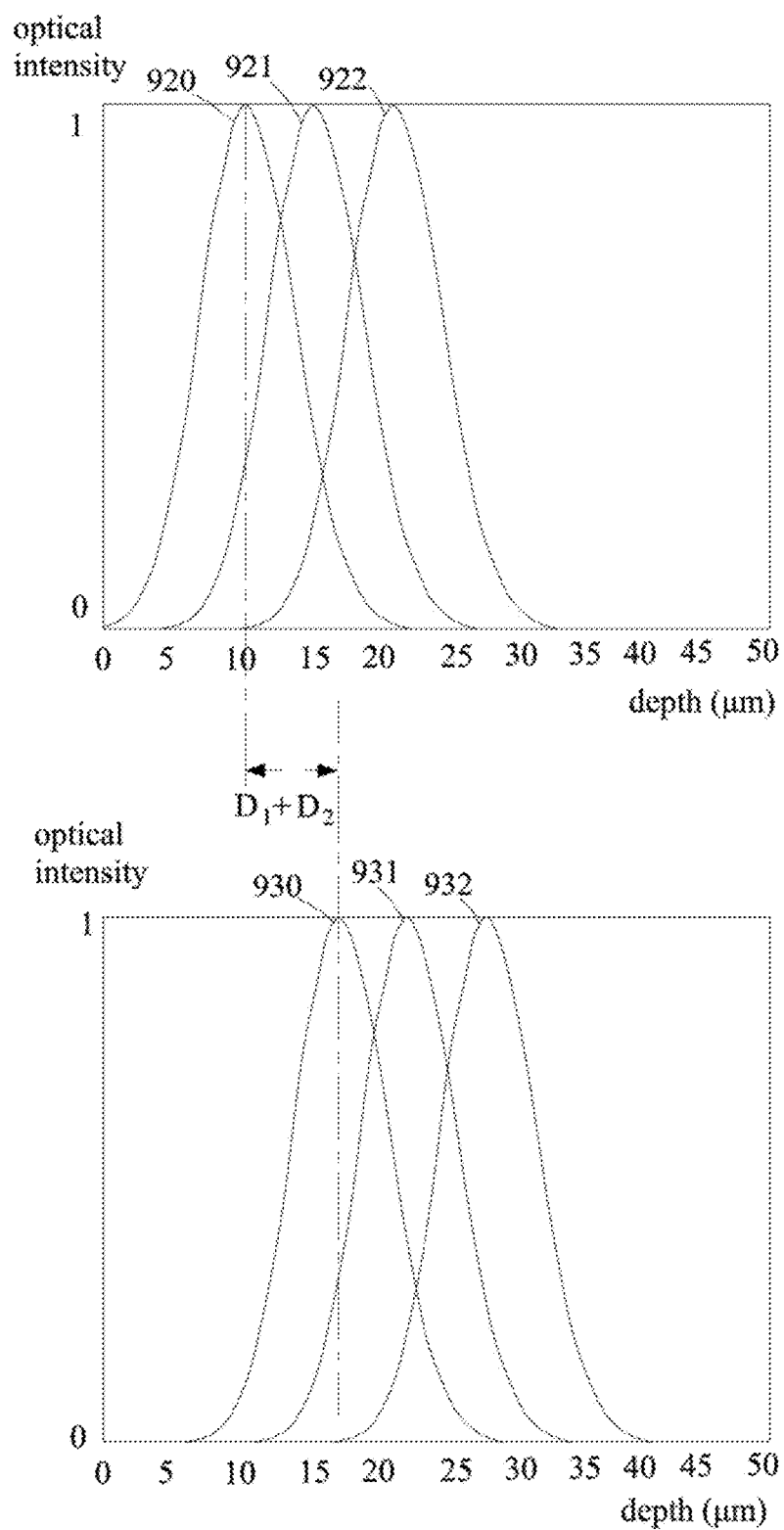
FIG. 7 illustrates the optical intensity information of the first and second calibration filtered light.

In the next step 313, the pair of color sensing units 25 and 26 respectively acquire the first calibration filtered light and the second calibration filtered light and transmit the acquired light signals to the signal processing unit 27 for obtaining a first calibration intensity curve of red light, a first calibration intensity curve of green light, and a first calibration intensity curve of blue light, and a second calibration intensity curve of red light, a second calibration intensity curve of green light, and a second calibration intensity curve of blue light, wherein a distance relation between the first position of the color sensing unit 25 and the focal point of the first calibration filtered light is different from a distance relation between the second position of the color sensing unit 26 and the focal point of the second calibration filtered light. Please refer to FIG. 7, which illustrates the optical intensity information of the first and second calibration filtered light. In FIG. 7, the curves 920, 921, and 922 respectively represent the first calibration intensity curve of red light, the first calibration intensity curve of green light, and the first calibration intensity curve of blue light, each of which depicts relation between surface depths of the calibration plane and the optical intensity. Meanwhile, curves 930, 931, and 932 respectively represent the second calibration intensity curve of red light, the second calibration intensity curve of green light, and the second calibration intensity curve of blue light, each of which depicts relation between surface depths of the calibration plane and the optical intensity.

Thereafter a step 314 is proceeded to perform a deconvolution calculation and normalization focal ratio index calculation on the first calibration intensity curve of red light, the first calibration intensity curve of green light, and the first calibration intensity curve of blue light, and the second calibration intensity curve of red light, the second calibration intensity curve of green light, and the second calibration intensity curve of blue light for respectively establishing a depth relation curve of red light, a depth relation curve of green light, and a depth relation curve of blue light.

In order to prevent measurement deviation caused by surface reflection variance with respect to different color lights from being affected by surface color of the object, in step 314, the normalization focal ratio index calculation is performed by utilizing equations (1) to (3) on the detected intensity signals of red light, green light and blue lights, wherein $n_r$, $n_g$, and $n_b$ respectively represent the reflection rate of red light, green light and blue light with respect to the surface of the object/calibration plane; $I_r(z)$, $I_g(z)$, and $I_b(z)$ respectively represent the calculation result of the optical intensity of red light, green light and blue light with respect to different depth; $I_{604r}(z)$, $I_{604g}(z)$, and $I_{604b}(z)$ respectively represent the optical intensity of red light, green light and blue light detected by the color sensing unit 25; and $I_{605r}(z)$, $I_{605g}(z)$, and $I_{605b}(z)$ respectively represent the optical intensity of red light, green light and blue light detected by the color sensing unit 26.

$$I_r(z) = (n_r \times I_{604r}(z) - n_r \times I_{605r}(z))/(n_r \times I_{604r}(z) + n_r \times I_{605r}(z)) \tag{1}$$

$$I_g(z) = (n_g \times I_{604g}(z) - n_g \times I_{605g}(z))/(n_g \times I_{604g}(z) + n_g \times I_{605g}(z)) \tag{2}$$

$$I_b(z) = (n_b \times I_{604b}(z) - n_b \times I_{605b}(z))/(n_b \times I_{604b}(z) + n_b \times I_{605b}(z)) \tag{3}$$

The equations (1) to (3) can be further simplified, thereby obtaining differential equations (4) to (6) listed below.

$$I_r(z) = (I_{604r}(z) - I_{605r}(z))/(I_{604r}(z) + I_{605r}(z)) \tag{4}$$

$$I_g(z) = (I_{604g}(z) - I_{605g}(z))/(I_{604g}(z) + I_{605g}(z)) \tag{5}$$

$$I_b(z) = (I_{604b}(z) - I_{605b}(z))/(I_{604b}(z) + I_{605b}(z)) \tag{6}$$

In simplified differential equations (4) to (6), $I_r(z)$, $I_g(z)$, and $I_b(z)$ respectively represent a normalization focal ratio index of red light, green light and blue light. The $I_r(z)$, $I_g(z)$ and $I_b(z)$ calculated by equations (4) to (6) will not be affected by the intensity cross talk of the reflected object light from the surface of the object, and, accordingly, those $I_r(z)$, $I_g(z)$, and $I_b(z)$ can correctly reveal the focus-to-depth relationship with respect to the object surface.

Figure 8A:
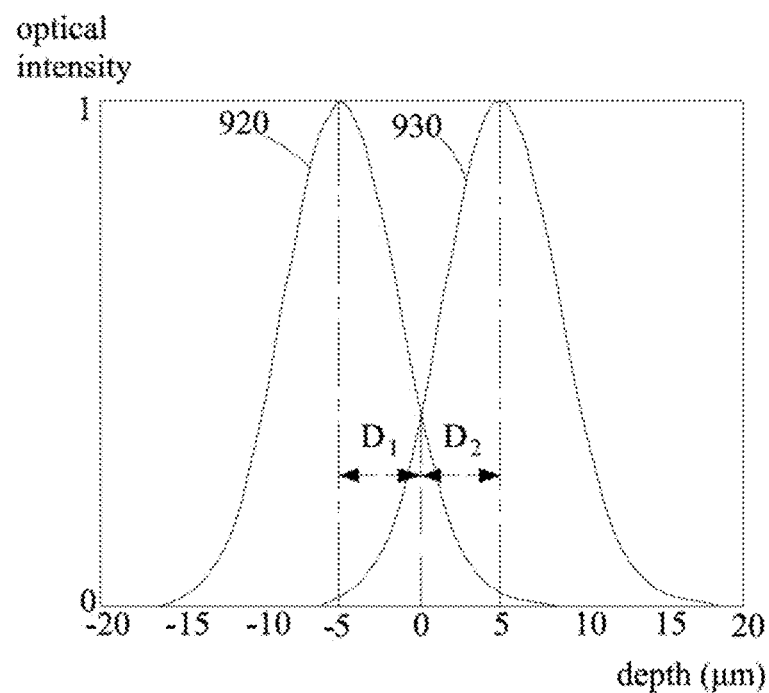
FIG. 8A illustrates curve of calibration intensity of red light with respect to the pair of color sensing units.

After obtaining the simplified differential equations (4) to (6), the intensity curve of red light, green light and blue light shown in FIG. 7 can be substituted into the corresponding parameter of equations (4) to (6), thereby obtaining a depth relation curve of red light, a depth relation curve of green light, and a depth relation curve of blue light. Please refer FIG. 8A, taking a procedure for obtaining a calibration depth relation curve of red light in step 314 as an example, wherein the curve 920 represents the optical intensity of red light detected by color sensing unit 25 while the curve 930 represents the optical intensity of red light detected by color sensing unit 26. When the values shown in FIG. 8A are substituted into the equation (4), representing the differential equation of red light, a depth relation curve shown in FIG. 8B will be obtained. Likewise, the depth relation curve of green light, and blue light can also be obtained according to the equations (5) and (6), which are all illustrated in FIG. 8C, wherein the curve 940 represents the depth relation curve of red light, the curve 941 represents the depth relation curve of green light, and the curve 942 represents the depth relation curve of blue light. It is noted that although the foregoing depth relation curves are established by planar object light, the linear object light can be utilized to establish those depth relation curves as well.

In addition, in another embodiment, in order to increase the range of measuring surface profile of the object, the equation (5) can be modified to form the equation (7) listed as below:

$$I_g(z)=(I_{605g}(z)-I_{604g}(z))/(I_{604g}(z)+I_{605g}(z)) \quad (7)$$

Figure 8B:
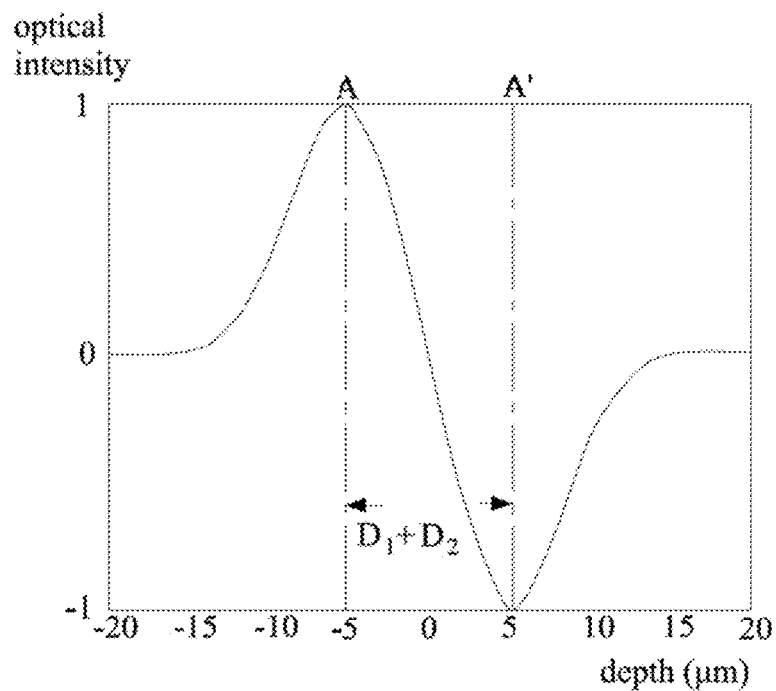
FIG. 8B illustrates depth relation curve of red light generated by a mapping process.
Figure 8C:
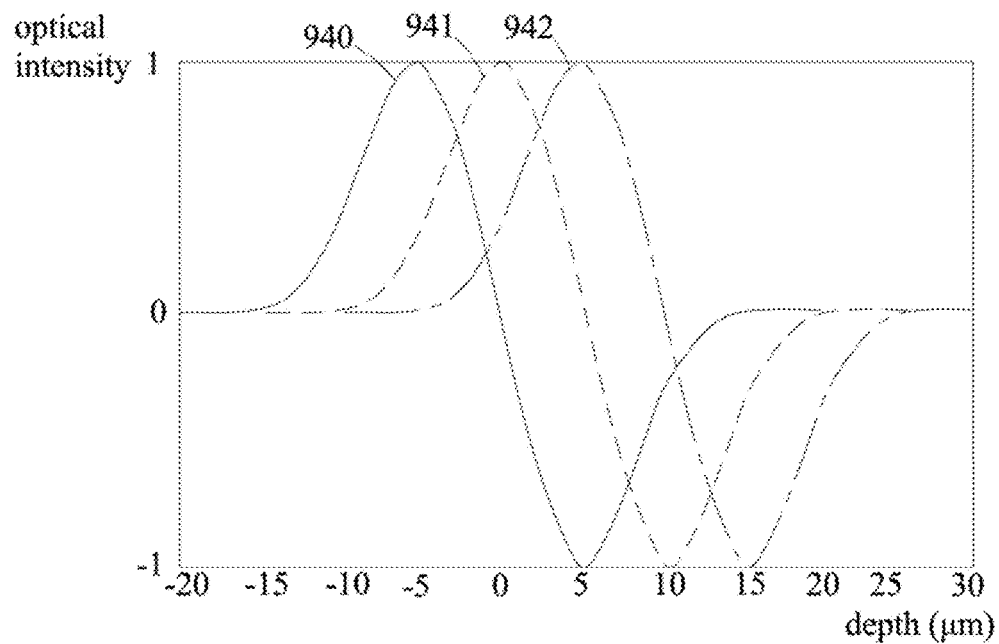
FIG. 8C illustrates depth relation curves of red, green and blue lights generated by a mapping process.
Figure 8D:
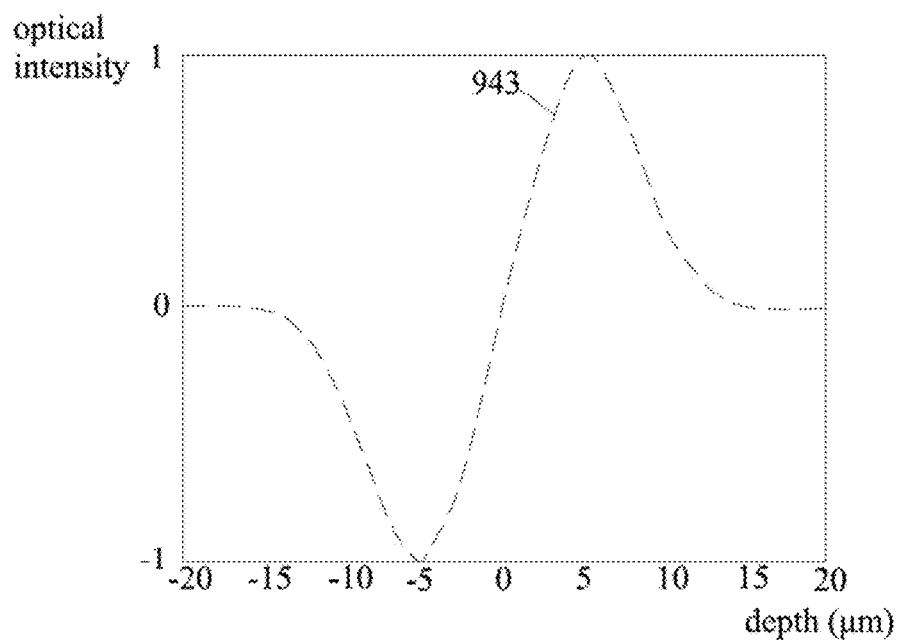
FIG. 8D illustrates another embodiment of the depth relation curves of green light generated by a mapping process.

According to the equation (7), the depth relation curve of green light is calculated and is shown in FIG. 8D. Since the numerator of equation (7) refers to a subtraction result by subtracting the optical intensity detected by color sensing unit 25 from the optical intensity detected by color sensing unit 26, which is opposite of the numerator of equation (5), a part of the curve shown in AA' area illustrated in FIG. 8B is left-right inversed, whereby the curve 943 shown in FIG. 8D can be obtained. Please refer to FIG. 8E, which illustrates depth relation curve 940 of red light, depth relation curve 943 of green light and depth relation curve 942 of blue light obtained according to equations (4), (6), and (7). After that, mapping a linear segment of the depth relation curve 940 of red light, and a linear segment of depth relation curve 942 of blue light are respectively performed thereby forming a linear mapping segment of red light and a linear mapping segment of blue light. Thereafter the linear mapping segment of red light is joined to a first end of the second linear segment, and the linear mapping segment of blue light is joined to a second end of the second linear segment such that a depth relation curve covering a large depth range can be obtained.

Figure 8E:
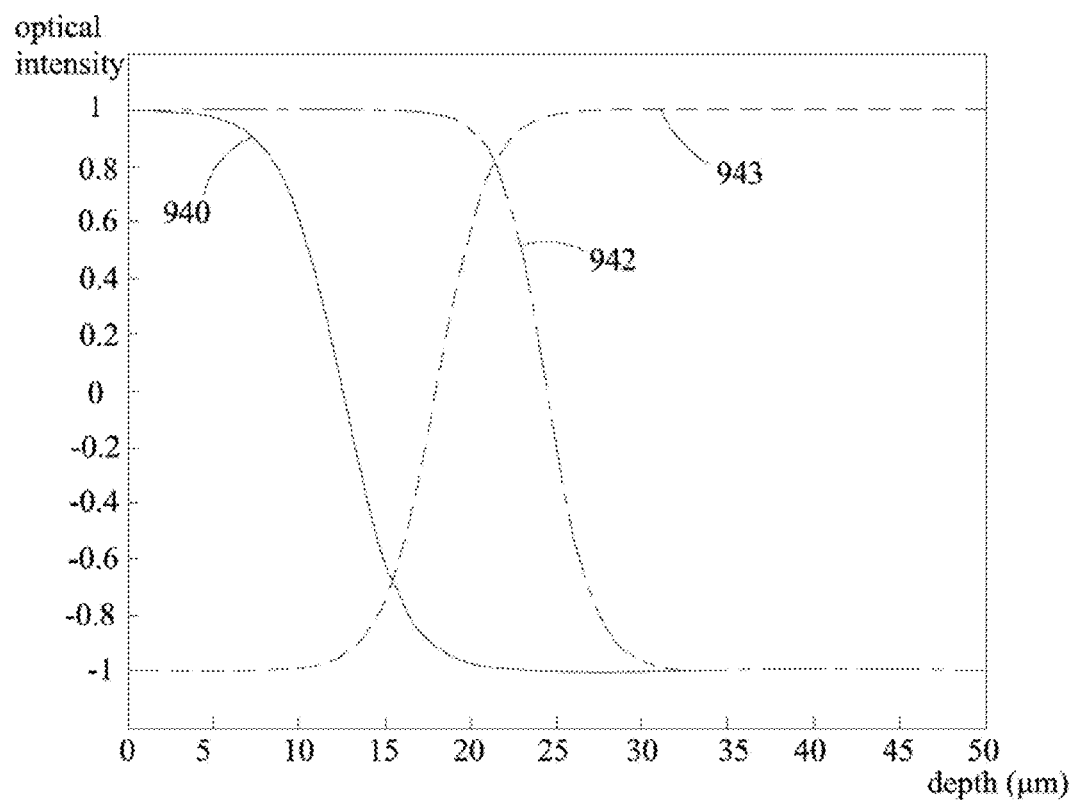
FIGS. 8E and 8F illustrate a combination procedure for forming the depth relation curve covering large depth range.
Figure 8F:
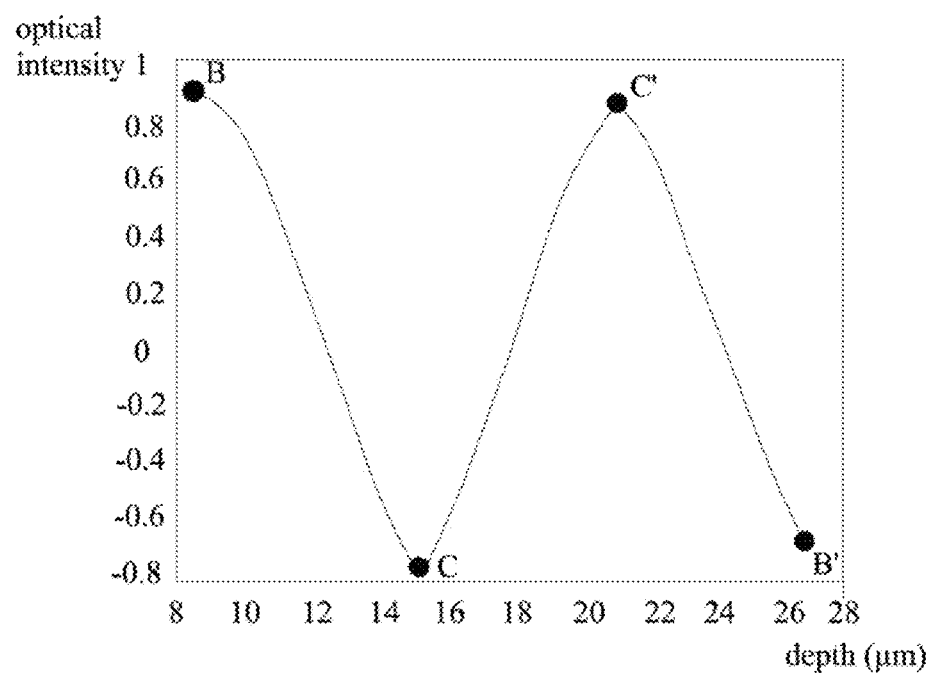

Please refer to FIGS. 8E and 8F for understanding a combination procedure for forming the depth relation curve covering large depth range. Firstly, a first intersection point C between the depth relation curve 940 of red light, and depth relation curve 943 of green light and a second intersection point C' between the depth relation curve 943 of green light, and depth relation curve 942 of blue light are respectively determined. Thereafter, a linear segment CB is acquired from the depth relation curve 940 of red light, a linear segment C'B' is acquired from the depth relation curve 942 of blue light, and a linear segment CC' is acquired from the depth relation curve 943 of green light. Next, the linear segment CB on the depth relation curve 940 of red light is mapped along a horizontal axis passing through intersection point C for forming a linear mapping segment of linear segment CB, while the linear segment C'B' on the depth relation curve 942 of blue light is mapped along a horizontal axis passing through C' for forming a linear mapping segment of linear segment C'B'. Finally, the linear mapping segment of linear segment CB, and linear mapping segment of linear segment C'B' are respectively join with the end point C and C' thereby forming a linear depth relation curve 95 (B'B) illustrated in FIG. 8G.

Figure 6A:
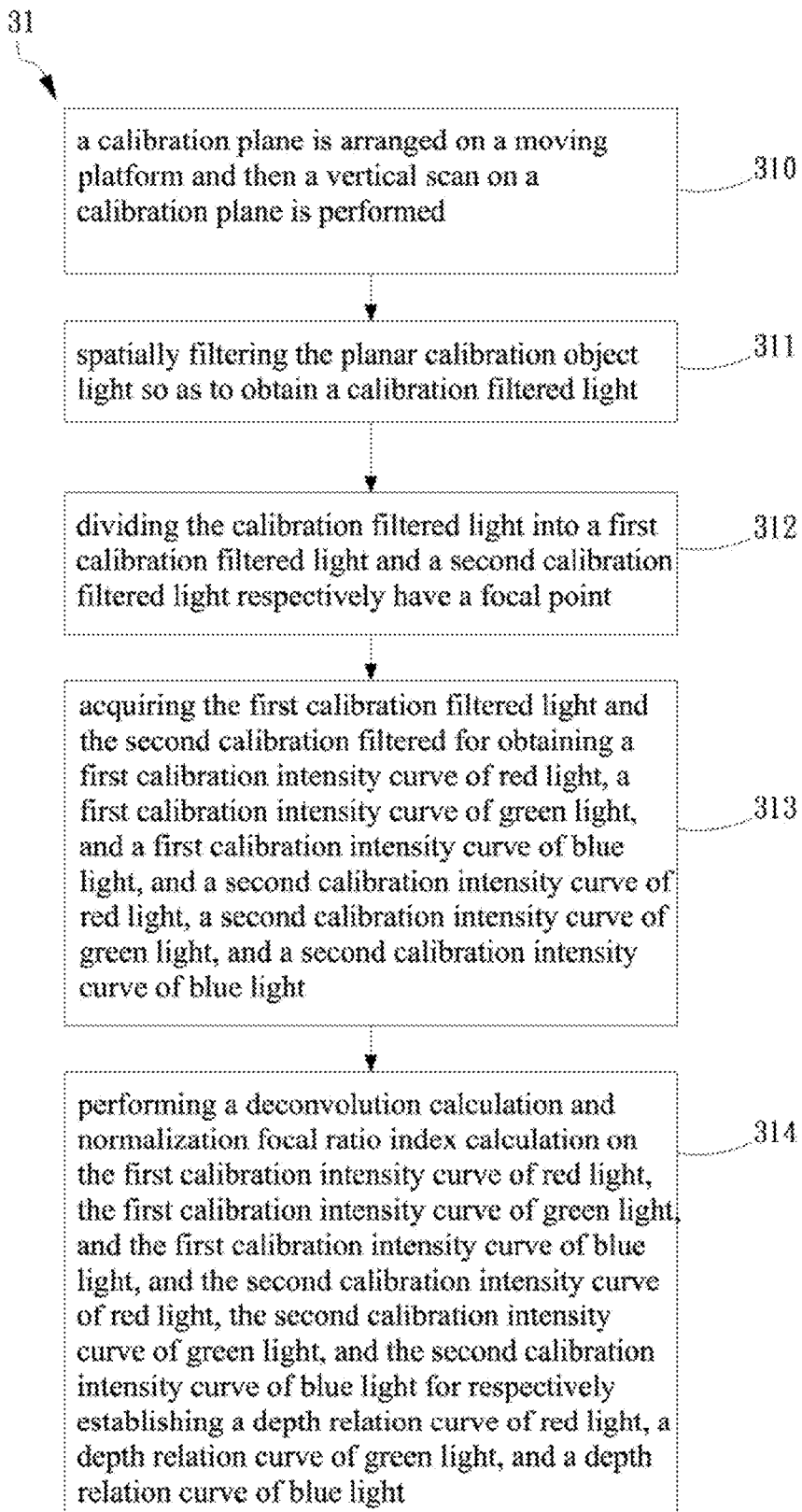
FIG. 6A illustrates an embodiment for establishing the depth relation curve of the chromatic confocal microscope system shown in FIG. 1A of the present invention.
Figure 8G:
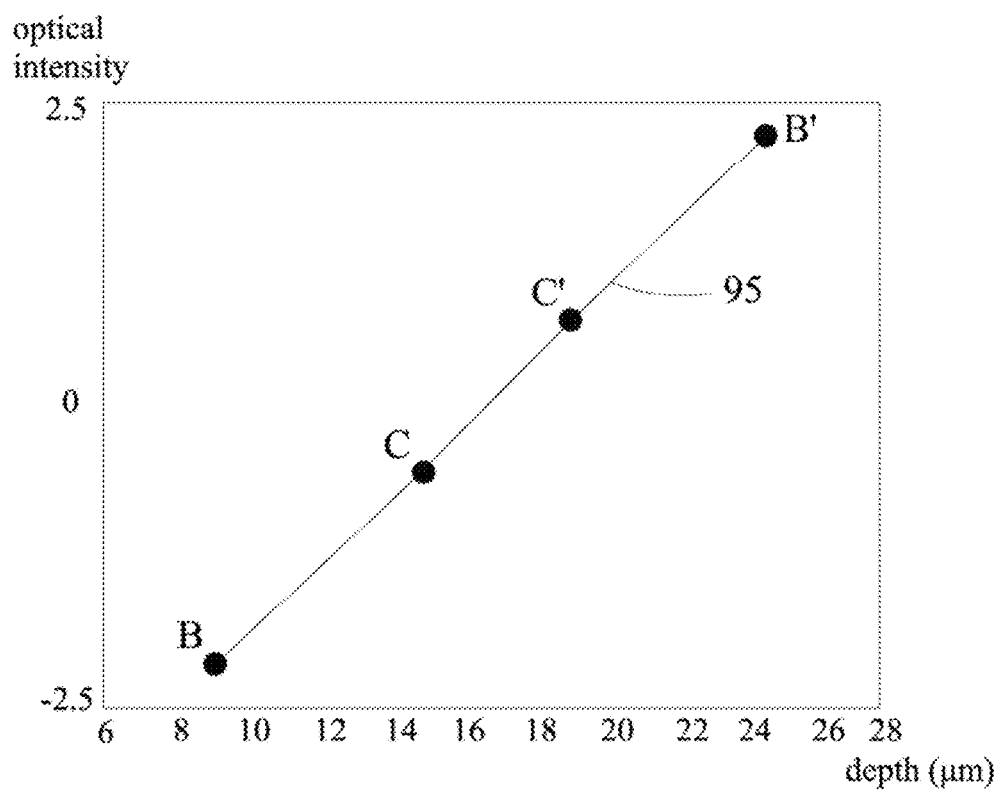
FIG. 8G illustrates a combined depth relation curve for RGB colors.

It is noted that either the depth relation curve shown in FIG. 8D, or depth relation curve shown in FIG. 8G, can be recognized as a single depth relation curve of the entire chromatic confocal microscope system. However, in another embodiment, the chromatic confocal microscope system can have a plurality of sub depth relation curves respectively corresponding to specific sensing area of the color sensing unit. For example, the calibration plane is divided a plurality of calibration areas respectively corresponding to the plurality of sensing areas of each color sensing unit. In one exemplary embodiment, each sensing area can refer to a sensing element (pixel) of the sensing chip in the color sensing unit. Thereafter, the steps shown in FIG. 6A are performed to establish the plurality of sub depth relation curves respectively corresponding to specific sensing area of each color sensing unit. According to the foregoing way, if the resolution of each color sensing unit is 640×480 pixels, and each pixel is defined as one of the sensing area of the color sensing unit, then 307, 200 sub depth relation curves can be established.

Figure 6B:
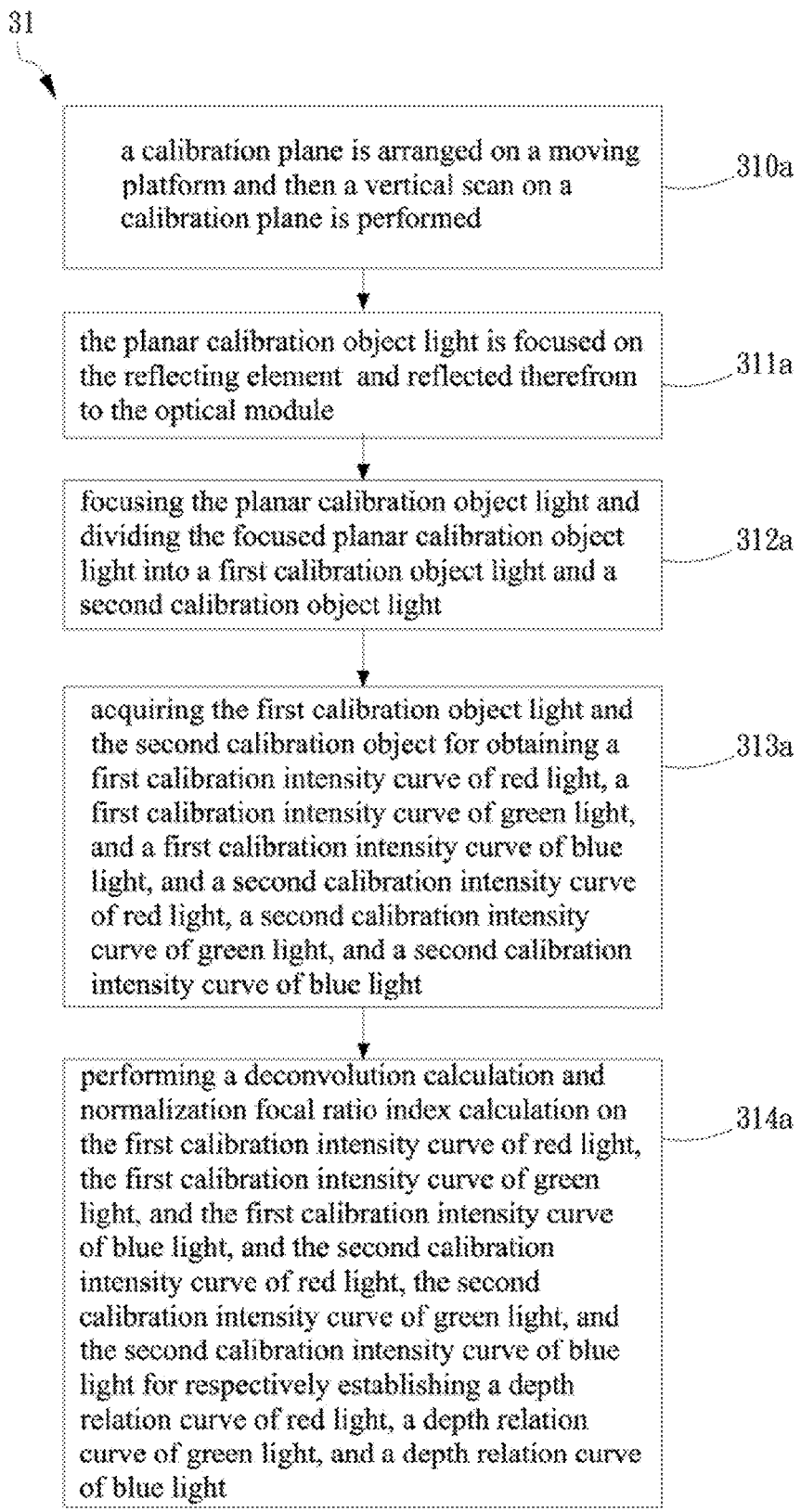
FIG. 6B illustrates another embodiment for establishing the depth relation curve of the chromatic confocal microscope system shown in FIG. 1B of the present invention.

In addition, it is noted that FIG. 6A illustrates steps for establishing depth relation curve for chromatic confocal microscope system shown in FIG. 1A. Alternatively, another similar flow shown in FIG. 6B is utilized for the chromatic confocal microscope system shown in FIG. 1B. In the steps shown in FIG. 6B, the step 310a is the same as the step 310, which will not be described hereinafter. In step 311a, the planar calibration object light is focused on the reflecting element 4 and reflected therefrom to the optical module 24. After that, the step 312a is performed, wherein the focus lens of the optical module 24 focuses the planar calibration object light and the focused planar calibration object light passes through the beam splitter 241 of the optical module 24, thereby being divided into a first calibration object light and a second calibration object light. Thereafter, the step 313a is performed wherein the pair of color sensing units 25 and 26 respectively acquire the first calibration object light and the second calibration object light with respect to different surface depth information and transmit the acquired optical intensity signals to the signal processing unit 27, thereby obtaining a first calibration intensity curve of red light, a first calibration intensity curve of green light, and a first calibration intensity curve of blue light, and a second calibration intensity curve of red light, a second calibration intensity curve of green light, and a second calibration intensity curve of blue light. It is noted that the locations that the pair of color sensing units 25 and 26 are arranged are the same as the criteria of step 314 described aforesaid, and it will not be described hereinafter. Then, a step 314a is performed by a deconvolution calculation and normalization focal ratio index calculation on the first calibration intensity curve of red light, the first calibration intensity curve of green light, and the first calibration intensity curve of blue light, and the second calibration intensity curve of red light, the second calibration intensity curve of green light, and the second calibration intensity curve of blue light for respectively establishing a depth relation curve of red light, a depth relation curve of green light, and a depth relation curve of blue light, which can be substituted into equations (4), (6), and (7) for obtaining a depth relation curve shown in FIG. 8G.

Please refer back to FIG. 1A and FIG. 5, after establishing depth relation curve, step 32 is performed, in which a detecting light from the light source module 20 is modulated by the first optical fiber module 21 so as to form a planar detecting light being projected onto a surface of the object 8 and reflected from the surface of the object 8 for forming a planar object light. Next, in step 33, the second optical fiber module 23 functions as a spatial filter for filtering the planar object light such that the planar object light is modulated into a planar filtered light, wherein the planar filtered light contains a plurality of sets of optical intensity signals respectively corresponding to a surface depth with respect to each inspected position on the object surface. Thereafter, in step 34, the planar filtered light is divided into a first filtered light and a second filtered light respectively having a focal point by the beam splitter 241 of the optical module 24. After that, step 35 is performed by utilizing the pair of color sensing units 25 and 26 to respectively acquire the first filtered light having a plurality of first optical intensity signals of red light, a plurality of first optical intensity signals of green light, and a plurality of first optical intensity signals of blue light, each plurality of first optical intensity signals are corresponding to the pixel resolutions of color sensing unit 25 and the second filtered light having a plurality of second optical intensity signals of red light, a plurality of second optical intensity signals of green light, and a plurality of second optical intensity signals of blue light, each plurality of second optical intensity signals are corresponding to the pixel resolution of color sensing unit 26. Taking color sensing unit 25 as an example, if the color sensing unit 25 has 640×480 pixel resolution, then the first filtered light has 640×480 set optical intensity signals, in which each set optical intensity signal has one first optical intensity signal of red light, one first optical intensity signal of green light, and one first optical intensity signal of blue light. Likewise, the second filtered light also has 640×480 set optical intensity signals, in which each set optical intensity signal has one second optical intensity signal of red light, one second optical intensity signal of green light, and one second optical intensity signal of blue light.

After obtaining the plurality of first and second optical intensity signals of red, green and blue lights, step 36 is proceeded by the signal processing unit 27 to perform a calculation on the plurality of first and second optical intensity signals of red, green and blue lights for obtaining a normalization focal ratio index of red light, a normalization focal ratio index of green light, and a normalization focal ratio index of blue light. In step 36, the first and second optical intensity signals of red, green and blue lights are substituted into the equations (4), (6) and (7) such that the normalization focal ratio index of red, green and blue lights corresponding to various inspected positions on the object surface, or corresponding to each pixel of each color sensing unit can be obtained. Finally, in step 37, a maximum ratio factor representing normalized optical intensity of each inspected position on the object surface is determined from the corresponding normalization focal ratio index of red, green, and blue lights. Since the optical intensity for each inspected position on the object surface is obtained and the corresponding depth relation curve shown in FIG. 8D or 8G depicting the relationship between the depth and optical intensity, the maximum ratio factor of each inspected position come out from step 37 can be utilized to determine the surface height of each inspected position of the object surface according to the corresponding depth relation curve shown in FIG. 8D or 8G, thereby generating the surface profile of the object surface.

It is noted that the curve shown in FIG. 8D refers to the same single depth relation curve for every sensing element of each color sensing unit whereas the curve shown in FIG. 8G refers that it can establish a plurality of depth relation curves for each sensing element of each color sensing unit so that the depth relation curve for each sensing element may be different from each other. Since each sensing element has a corresponding depth relation curve, the surface of the object surface can be more accurate than utilizing the same single depth relation curve for determining the object surface profile. It also noted that although the planar detecting light is utilized for steps 30 to 37, the linear detecting light can be utilized for inspecting the object surface by a combination of lateral scanning and vertical scanning as well.

Figure 9:
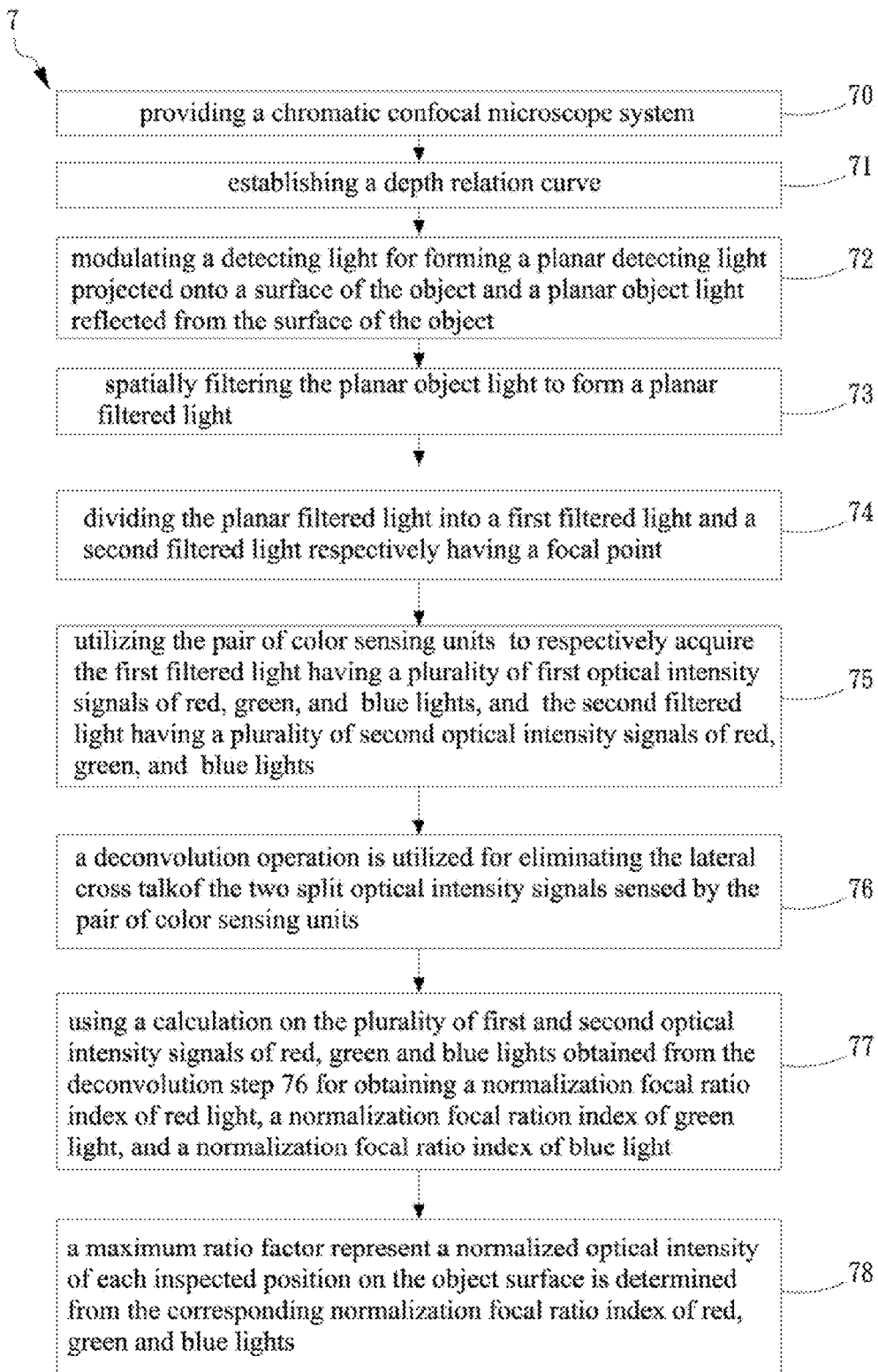
FIG. 9 illustrates another flow chart for processing the optical signal acquired by the chromatic confocal microscope system.

In addition, another embodiment is shown in FIG. 9, which illustrates another flow chart for processing the optical signal acquired by the chromatic confocal microscope system. In the present embodiment, the steps 70~75 of the signal processing method shown in FIG. 9 are basically the same as the steps 30~35 shown in FIG. 5, the difference therebetween is the step 76 of the present embodiment further comprises a step for eliminating cross talk of the two split optical intensity signals sensed by the pair of color sensing units 25 and 26 shown in FIG. 1A or 1B.

It is noted that there are several ways for eliminating the cross talk, in the present embodiment of step 76, a deconvolution operation is utilized an as exemplary embodiment for eliminating the lateral cross talk. For planar light source, the planar type CCD, i.e. color sensing units 25 and 26 of FIGS. 1A and 1B, are utilized for detecting the reflected light from object. It is noted that, practically, the planar object light is not perfectly focused to form a single focal point on each sensing element of the CCD; therefore, each sensing element of CCD will also detect the optical signal from the adjacent optical signals which can be referred as a root cause for generating the cross talk interference, thereby affecting the image quality and resolution formed by each color sensing unit. Please refer to FIG. 13, which illustrates lateral cross talk interference for sensing element in CCD. There has five sensing elements 50~54 shown in FIG. 13. Actually, when the object light is projected onto the sensing area of CCD, each sensing element 50~54 will senses multiple lights, each of which has a point spread function (PSF). Taking the sensing element 52 and the second optical fiber module 23 in FIG. 1A as an example, the sensing 52 can sense lights having PSF 60~62 emitted from the optical fiber module 23 spontaneously, wherein curve 60 represents the PSF of the object light corresponding to the sensing element 52. In addition to PSF 60, the sensing element 52 can also sense the sub optical wavelet from the PSF 61 and 62, which is called the cross talk interference.

Since each pixel formed the image obtained by the planar CCD contains the main optical wavelet of PSF 60 and sub optical wavelet of PSF 61 and 62, which can be expressed by the equation (8) listed as below, $$I'(\lambda,v)=h(v)\oplus I(\lambda,v) \quad (8)$$

wherein v represents the lateral position, $\oplus$ represents convolution calculation, $I'(\lambda, v)$ represents the intensity of object lights detected by the planar CCD, $I(\lambda, v)$ represents the original light intensity of the object light, and $h(\epsilon, v)$ represents the point spread function. It is noted that $\lambda$ of $I'(\lambda, v)$ represents the wavelength of each color signal; i.e. the $I'(\lambda, v)$ can be the first optical intensity signal of red light, the first optical intensity signal of green light, the first optical intensity signal of blue light, the second optical intensity signal of red light, the second optical intensity signal of green light, or the second optical intensity signal of blue light.

Figure 10:
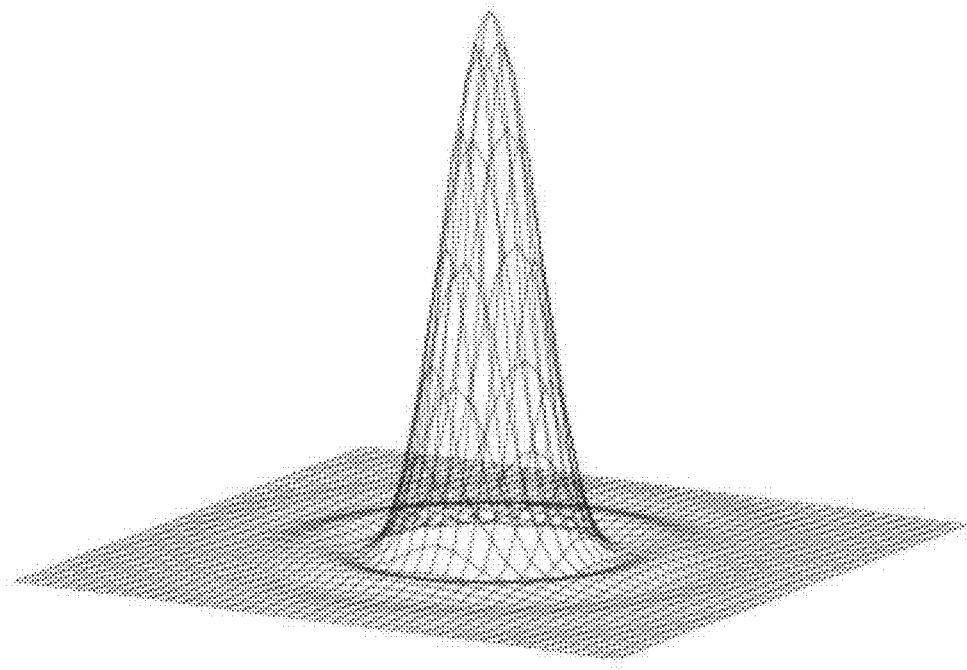
FIG. 10 illustrates a point spread function of a light.
Figure 13:
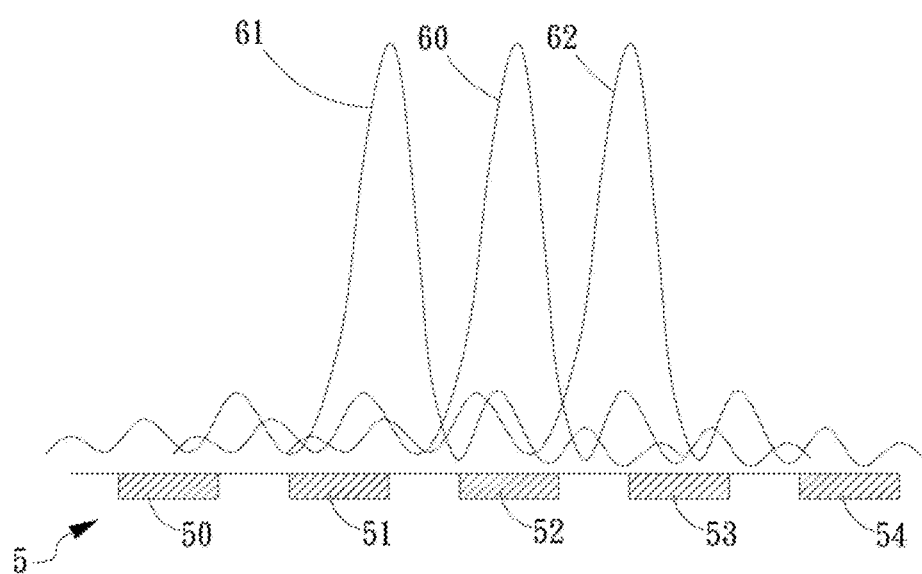
FIG. 13 illustrates lateral cross talk interference for sensing element in CCD.

From the schematic shown in FIG. 13, it is known that the lateral cross talk is generated by point spread effect from the adjacent lights for the other sensing elements on the CCD. Please refer FIG. 10, the point spread effect caused the lateral cross talk can be expressed as equation (9) listed below, $$h(\varepsilon, \upsilon) = \frac{1}{(1-\varepsilon^2)} \left[ \frac{2J_1(\upsilon)}{\upsilon} - \varepsilon^2 \left( \frac{2J_1(\varepsilon\upsilon)}{\varepsilon\upsilon} \right) \right], \quad (9)$$

$$\upsilon = \frac{2\pi}{\lambda} r \sin\alpha$$

wherein α represents an angle equal to half of the aperture angle of the objective, which can be the chromatic dispersion objective 22 shown in FIG. 1A or 1B, r represents a radius defined in polar coordinate, $J_1$ is a first order Bessel function, v is a lateral position, and ε is depth position.

For a plane that ε is equal to 0, the equation (9) can be simplified into equation (10) list below:

$$h(v) = \frac{2J_1(v)}{v} \quad (10)$$

Accordingly, the I'(λ, v) shown in equation (8) can be further expressed by convolution equation (11) listed below, $$I'(\lambda, v) = \left( \frac{2J_1(v)}{v} \right) \otimes \left[ \frac{\sin\left(\frac{\pi}{\lambda} NA^2 z(\lambda)\right)}{\left(\frac{\pi}{\lambda} NA^2 z(\lambda)\right)} \right]^2 \quad (110)$$

wherein NA refers to numerical aperture, z is focus-to-depth, and λ represents wavelength.

Figure 11:
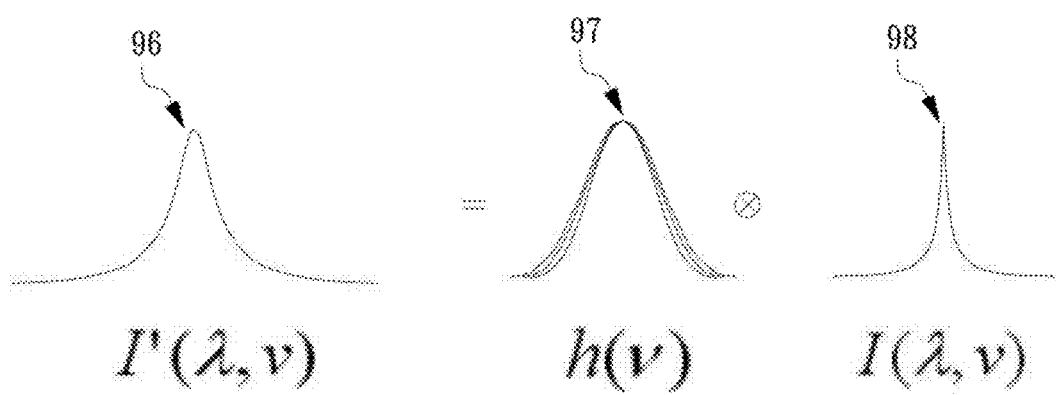
FIG. 11 illustrates a relation between the optical intensity distribution $I(\lambda, v)$ and PSF $h(\epsilon, v)$.

Please refer to FIG. 11, which illustrates relation between the optical intensity distribution I(λ, v) and PSF h(ε, v), wherein numeric notation 96 represents a curve referring to the optical intensity distribution I'(λ, v), numeric notation 97 represents a curve referring to PSF, and numeric notation 98 represents a curve referring to original optical intensity distribution I(λ, v). It is clear that comparing to the optical intensity distribution I'(λ, v), the two lateral sides of the curve 98 are narrowed down, which means that the lateral cross talk is reduced.

Since lateral cross talk caused by point spread effect will increase the full width at half modulation (FWHM) on the intensity signal curve corresponding to each sensing element of CCD, thereby reducing the accuracy of surface profile restoration, to overcome the lateral cross talk, a deconvolution calculation is performed to convert the equation (11) into frequency domain, which is expressed by equation (12) listed below, $$I'(w) = h(w) \oplus I(w) \quad (12)$$

wherein w is frequency in frequency domain.

After shifting the I(w) and I'(w) alternately, and subsequently inversely converting the equation from the frequency domain to time domain, the I(λ, v) can be expressed by equation (13) listed below.

$$I(\lambda, v) = F^{-1}(I'(w)/h(w)) \quad (13)$$

By means of the deconvolution calculation by equations (12) and (13), the optical intensity signals obtained by the CCD can be more effectively to improve the accuracy of surface profile inspection. In a further embodiment, a Lucy-Richardson deconvolution, expressed as equation (14), can be further induced to iterate the optical intensity signals thereby removing the noise of the image and increasing contract of the images.

$$o^{(n+1)} = \left( \frac{i}{o^{(n)} \otimes h} \otimes \tilde{h} \right) o^{(n)} \quad (14)$$

In equation (14), $o^{(n+1)}$ represents the processed image after Lucy-Richardson deconvolution, $o^{(n)}$ represents images wait for process, h is PSF, i is original image, i.e. n=0, $o^{(0)}$=i, and $\tilde{h}$ is self-adjoint operator of h.

Figure 12:
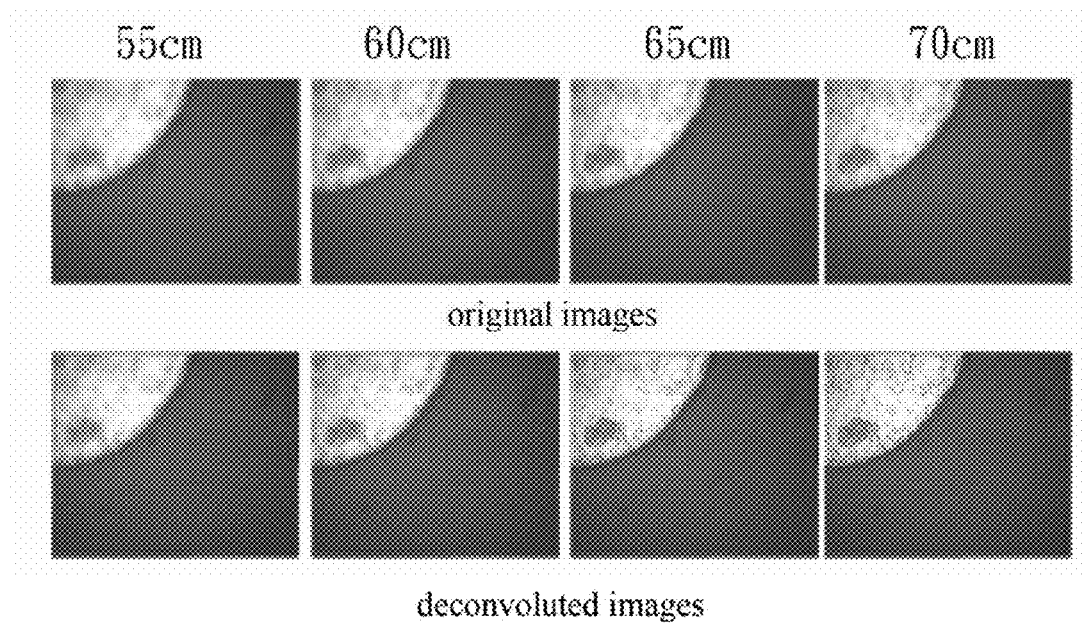
FIG. 12 illustrates a plurality images with respect to different scanning depth obtained from the vertical scanning of the chromatic confocal microscope system before and after the deconvolution process.

Please refer to FIG. 12, which illustrates a plurality of images with respect to different scanning depth obtained from the vertical scanning of the chromatic confocal microscope system before and after the deconvolution process. In FIG. 12, the upper part has four images respectively with their specific scanning depths when the deconvolution process is applied, whereas the lower part has the corresponding four images having been processed with deconvolution process. It is clear that the lower four images have better contrast comparing with the upper four images.

Please refer to FIG. 9, after step 76 for eliminating the lateral cross talk, step 77 is performed by using a calculation on the plurality of first and second optical intensity signals of red, green and blue lights obtained from the deconvolution step 76 for obtaining a normalization focal ratio index of red light, a normalization focal ratio index of green light, and a normalization focal ratio index of blue light. The step 77 is similar to the step 36, which will not be described in detail hereinafter. Finally, in step 78, a maximum ratio factor represent a normalized optical intensity of each inspected position on the object surface is determined from the corresponding normalization focal ratio index of red, green and blue lights. Since the optical intensity for each inspected position on the object surface is obtained and the corresponding depth relation curve shown in FIG. 8D or 8G depicting the relation between the depth and optical intensity, the maximum ratio factor of each inspected position generated from step 78 can be utilized to determine the surface height of each inspected position of the object surface according to the corresponding depth relation curve shown in FIG. 8D or 8G, thereby generating the surface profile of the object surface.

Since the present invention utilized a planar detecting light projected onto the object, and detected the reflected object light by color sensing units such as color CCD, the surface height information of each inspection position on the object surface are contained within the optical intensity signals sensed by each sensing element of each color sensing unit. Accordingly, the surface profile can be restored immediately and accurately by analyzing the optical intensity signal detected by each sensing element only by a one-shot detection. In addition, if the detecting light is a linear detecting light, the surface profile can be restored immediately and accurately accompanied with a lateral movement.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A chromatic confocal microscope system, comprising:

a light source module for providing a linear or a planar detecting light;

a chromatic dispersion objective for axially dispersing the linear or the planar detecting light thereby forming a plurality of sub lights respectively having a focal length different from each other, and projecting the plurality of sub lights on a surface of an object for forming a linear or a planar object light;

an optical module for splitting the linear or the planar object light into a first object light having a first focal point and a second object light having a second focal point; and a pair of color sensing units for respectively receiving the first object light at a first position and the second object light at a second position for respectively generating a plurality of sets of first RGB intensity signals and a plurality of sets of second RGB intensity signals, wherein each set of first and second RGB intensity signals are corresponding to each inspection position on the surface receiving the linear or the planar detecting light of the object, and each set of first RGB intensity signals has a first red light intensity signal, a first green light intensity signal, and a first blue light intensity signal, and each set of second RGB intensity signals has a second red light intensity signal, a second green light intensity signal, and a second blue light intensity signal, wherein a distance relation between the first position and the first focal point of the first object light is different from a distance relation between the second position and the second focal point of the second object light; and a signal processing unit for performing a calculation on the plurality sets of first and second RGB intensity signals for obtaining a normalization focal ratio index of red light, a normalization focal ratio index of green light, and a normalization focal ratio index of blue light, wherein the normalization focal ratio index of red light is a result of dividing a subtraction of first and second red light intensity signals by a summation of first and second red light intensity signals, the normalization focal ratio index of green light is a result of dividing a subtraction of first and second green light intensity signals by a summation of first and second green light intensity signals, and the normalization focal ratio index of blue light is a result of dividing a subtraction of first and second blue light intensity signals by a summation of first and second blue light intensity signals.

2. The system of claim 1, wherein one of the pair of the color sensing units is arranged at the first position located in front of the first focal point of the first object light while the other one of the pair of the color sensing units is arranged at the second position located in rear of the second focal point of the second object light.

3. The system of claim 1, wherein the signal processing unit further respectively deconvoluts the plurality sets of first RGB intensity signals, and the plurality sets of second RGB intensity signals for reducing cross talk of the plurality sets of first and second RGB intensity signals.

4. The system of claim 1, wherein the signal processing unit determines a maximum ratio factor from the normalization focal ratio index of red light, the normalization focal ratio index of green light, and the normalization focal ratio index of blue light for each inspection position, and determines a surface profile of the object according to the maximum ratio factor of each inspection position and a corresponding depth relation curve.

5. The system of claim 1, wherein the chromatic dispersion objective comprising at least two chromatic aberration lenses for axially dispersing the linear or the planar detecting light.

6. The system of claim 1, wherein the light source module further comprises:

a light source; and a first optical fiber module, comprising at least one first fiber bundle and each first optical fiber bundle having one-dimensional arrangement for modulating a light from the light source into the linear or the planar detecting light.

7. The system of claim 6, further comprising a second optical fiber module which is disposed between the chromatic dispersion objective and the optical module, wherein the second optical fiber module comprises at least one second optical fiber bundle and each second optical fiber bundle has one-dimensional arrangement conjugating to the at least one first fiber bundle for spatially filtering the linear or the planar object light.

8. The system of claim 1, further comprising a reflecting element for receiving the linear or the planar object light wherein the chromatic dispersion objective focuses the linear or the planar object light onto the reflecting element so that the reflecting element reflects the linear or the planar object light onto the optical module.

9. The system of claim 8, wherein the reflecting element is a micro-reflector array.

10. A method for processing signal generated from a chromatic confocal microscope system, comprising steps of:

providing a chromatic confocal microscope system having a chromatic dispersion objective and a pair of color sensing units;

establishing a depth relation curve with respect to a calibration plane arranged on the chromatic confocal microscope system;

forming a plurality of sub lights respectively having a focal length different from each other by utilizing the chromatic dispersion objective to axially disperse a linear or a planar detecting light;

projecting the plurality of sub lights onto a surface of an object and the plurality of sub lights being reflected therefrom for forming a linear or a planar object light;

splitting the linear or the planar object light into a first object light and a second object light, wherein the first and second object light are focused on a respective first focal and second focal point;

utilizing the pair of color sensing units for respectively receiving the first object light at a first position and the second object light at a second position for respectively generating a plurality of sets of first RGB intensity signals and a plurality of sets of second RGB intensity signals, wherein each set of first and second RGB intensity signals is corresponding to each inspection position on the surface receiving the linear or the planar detecting light of the object, and each set of first RGB intensity signals has a first red light intensity signal, a first green light intensity signal, and a first blue light intensity signal, and each set of second RGB intensity signals has a second red light intensity signal, a second green light intensity signal, and a second blue light intensity signal, wherein a distance relation between the first position and the first focal point of the first object light is different from a distance relation between the second position and the second focal point of the second object light;

performing a calculation on the plurality sets of first and second RGB intensity signals for obtaining a normalization focal ratio index of red light, a normalization focal ratio index of green light, and a normalization focal ratio index of blue light;

determining a maximum ratio factor from the normalization focal ratio index of red light, the normalization focal ratio index of green light, and the normalization focal ratio index of blue light, wherein the normalization focal ratio index of red light is a result of dividing a subtraction of first and second red light intensity signals by a summation of first and second red light intensity signals, the normalization focal ratio index of green light is a result of dividing a subtraction of first and second green light intensity signals by a summation of first and second green light intensity signals, and the normalization focal ratio index of blue light is a result of dividing a subtraction of first and second blue light intensity signals by a summation of first and second blue light intensity signals; and determining a surface profile of the surface of the object according to the maximum ratio factor of each inspection position and the depth relation curve.

11. The method of claim 10, wherein establishing the depth relation curve further comprises steps of:

performing a vertical scan on the calibration plane by projecting the linear or the planar detecting light onto an inspection position of the calibration plane thereby forming a plurality of linear or planar calibration object lights respectively having a focal length different from each other;

splitting the plurality of linear or planar calibration object lights into a plurality of first calibration object lights and a plurality of second calibration object lights;

receiving respectively the plurality of first calibration object lights and the plurality of second calibration object lights by the pair of color sensing units thereby respectively generating a first calibration intensity curve of red light, a first calibration intensity curve of green light, and a first calibration intensity curve of blue light, and a second calibration intensity curve of red light, a second calibration intensity curve of green light, and a second calibration intensity curve of blue light; and performing a deconvolution calculation and normalization focal ratio index calculation on the first calibration intensity curve of red light, the first calibration intensity curve of green light, and the first calibration intensity curve of blue light, and the second calibration intensity curve of red light, the second calibration intensity curve of green light, and the second calibration intensity curve of blue light for respectively establishing a depth relation curve of red light, a depth relation curve of green light, and a depth relation curve of blue light.

12. The method of claim 11, wherein the calculation of normalization focal ratio index further comprises steps of dividing a subtraction result of subtracting the second calibration intensity curve from the first calibration intensity curve of red light by a summation result of adding the first and the second calibration intensity curves of red light corresponding to different vertical scanning depths, dividing a subtraction result of subtracting the second calibration intensity curve of green light from the first calibration intensity curve of green light by a summation result of the first and the second calibration intensity curves of green light corresponding to different vertical scanning depths, and dividing a subtraction result of subtracting the second calibration intensity curve of blue light from the first calibration intensity curve of blue light by a summation of the first and the second calibration intensity curves of blue light corresponding to different vertical scan depths.

13. The method of claim 11, wherein the inspection position of the calibration plane is corresponding to a pixel of each color sensing unit, and the step for establishing depth relation curve further comprises step of changing the inspection position where the linear or planar detecting light being projected for establishing different depth relation curve corresponding to each pixel of the color image sensing unit.

14. The method of claim 11, wherein the calculation of normalization focal ratio index further comprises steps of dividing a subtraction result of subtracting the second calibration intensity curve from the first calibration intensity curve of red light by a summation result of adding the first and the second calibration intensity curves of red light corresponding to different vertical scanning depths, dividing a subtraction result of subtracting the first calibration intensity curve of green light from the second calibration intensity curve of green light by a summation result of the first and the second calibration intensity curves of green light corresponding to different vertical scanning depths, and dividing a subtraction result of subtracting the second calibration intensity curve of blue light from the first calibration intensity curve of blue light by a summation of the first and the second calibration intensity curves of blue light corresponding to different vertical scan depths.

15. The method of claim 14, further comprising a step of acquiring a first linear segment of the depth relation curve of red light, a second linear segment of the depth relation curve of green light, and a third linear segment of the depth relation curve of blue light.

16. The method of claim 15, wherein the steps for obtaining the depth relation curve further comprises steps of:

mapping the first linear segment of the depth relation curve of red light and the third linear segment of the depth relation curve of blue light for respectively obtaining a linear mapping segment of blue light and a linear mapping segment of red light; and obtaining the depth relation curve by joining the linear mapping segment of red light to a first end of the second linear segment, and joining the linear mapping segment of blue light to a second end of the second linear segment.

17. The method of claim 10, wherein the chromatic confocal microscope system further comprises a first optical fiber module, comprising at least one first optical fiber bundle having one-dimensional arrangement for modulating a light from a light source into the linear or the planar detecting light, and a second optical fiber module comprising at least one second optical fiber bundle having one-dimensional arrangement conjugating to the at least one first optical fiber bundle for spatially filtering the linear or the planar object light.

18. The method of claim 17, wherein establishing the depth relation curve further comprises steps of:

performing a vertical scan on a calibration plane by projecting the linear or the planar detecting light onto a inspection position of the calibration plane thereby forming a plurality of linear or planar calibration object lights respectively having a focal length different from each other;

spatially filtering the plurality of linear or planar calibration object lights by the second optical fiber module for obtaining a plurality of calibration filtered lights;

splitting the plurality of calibration filtered lights into a plurality of first calibration filtered lights and a plurality of second calibration filtered lights;

receiving respectively the plurality of first calibration filtered lights and the plurality of second calibration filtered lights by the pair of color sensing units thereby respectively generating a first calibration intensity curve of red light, a first calibration intensity curve of green light, and a first calibration intensity curve of blue light, and a second calibration intensity curve of red light, a second calibration intensity curve of green light, and a second calibration intensity curve of blue light; and performing a deconvolution calculation and normalization focal ratio index calculation on the first calibration intensity curve of red light, the first calibration intensity curve of green light, and the first calibration intensity curve of blue light, and the second calibration intensity curve of red light, the second calibration intensity curve of green light, and the second calibration intensity curve of blue light for respectively establishing a depth relation curve of red light, a depth relation curve of green light, and a depth relation curve of blue light.

19. The method of claim 18, wherein the position is corresponding to a pixel of each color sensing unit, and the step for establishing depth relation curve further comprises step of changing the inspection position where the linear or the planar detecting light being projected for establishing different depth relation curve corresponding to each pixel of the color image sensing unit.

20. The method of claim 18, wherein the calculation of normalization focal ratio index further comprises steps of dividing a subtraction result of subtracting the second calibration intensity curve from the first calibration intensity curve of red light by a summation result of adding the first and the second calibration intensity curves of red light corresponding to different vertical scanning depths, dividing a subtraction result of subtracting the second calibration intensity curve of green light from the first calibration intensity curve of green light by a summation result of the first and the second calibration intensity curves of green light corresponding to different vertical scanning depths, and dividing a subtraction result of subtracting the second calibration intensity curve of blue light from the first calibration intensity curve of blue light by a summation of the first and the second calibration intensity curves of blue light corresponding to different vertical scan depths.

21. The method of claim 18, wherein the calculation of normalization focal ratio index further comprises steps of dividing a subtraction result of subtracting the second calibration intensity curve from the first calibration intensity curve of red light by a summation result of adding the first and the second calibration intensity curves of red light corresponding to different vertical scanning depths, dividing a subtraction result of subtracting the first calibration intensity curve of green light from the second calibration intensity curve of green light by a summation result of the first and the second calibration intensity curves of green light corresponding to different vertical scanning depths, and dividing a subtraction result of subtracting the second calibration intensity curve of blue light from the first calibration intensity curve of blue light by a summation of the first and the second calibration intensity curves of blue light corresponding to different vertical scan depths.

22. The method of claim 21, further comprising a step of acquiring a first linear segment of the depth relation curve of red light, a second linear segment of the depth relation curve of green light, and a third linear segment of the depth relation curve of blue light.

23. The method of claim 22, wherein the steps for obtaining the depth relation curve further comprises steps of:

mapping the first linear segment of the depth relation curve of red light and the third linear segment of the depth relation curve of blue light for respectively obtaining a linear mapping segment of blue light and a linear mapping segment of red light; and obtaining the depth relation curve by joining the linear mapping segment of red light to a first end of the second linear segment, and joining the linear mapping segment of blue light to a second end of the second linear segment.

24. The method of claim 10, further comprising step of deconvoluting the plurality sets of first RGB intensity signals, and the plurality sets of second RGB intensity signals for reducing cross talk of the plurality sets of first and second RGB intensity signals.

* * * * *